United States Patent [19]

Su et al.

[11] Patent Number: 5,418,717

[45] Date of Patent: May 23, 1995

[54] MULTIPLE SCORE LANGUAGE PROCESSING SYSTEM

[76] Inventors: Keh-Yih Su, Kuan Fu Road, Sec. 2, East Yuan, No. 62, 3F, Tsing Hua University, Hsinchu, Taiwan; Jing-Shin Chang, Hsiao Tung Li, No. 73, YunLin Hsien, Taiwan; Jong-Nae Wang, Tsin Nung Road, Sec. 3, 185 Hsiang, 13 Lung, No. 19, 2F, Ching Mei, Taipei, Taiwan, all of China; Mei-Hui Su, 806 Fountain Park La., Mountain View, Calif. 94043

[21] Appl. No.: 806,171

[22] Filed: Dec. 12, 1991

Related U.S. Application Data

[63] Continuation-in-part of Ser. No. 574,411, Aug. 27, 1990, abandoned.

[51] Int. Cl.⁶ .............................................. G06F 15/38
[52] U.S. Cl. ............................................. 364/419.08
[58] Field of Search .............. 364/419, 419.08, 419.03, 364/419.01

[56] References Cited

U.S. PATENT DOCUMENTS

| | | |
|---|---|---|
| 4,502,128 | 2/1985 | Okajima et al. . |
| 4,586,160 | 4/1986 | Amano et al. . |
| 4,635,199 | 1/1987 | Murski . |
| 4,661,924 | 4/1987 | Okamoto et al. . |
| 4,706,212 | 11/1987 | Toma . |
| 4,787,038 | 11/1988 | Doi et al. . |
| 4,791,587 | 12/1988 | Doi . |
| 4,800,522 | 1/1989 | Miyao et al. . |
| 4,864,501 | 9/1989 | Kucera et al. . |
| 4,864,502 | 9/1989 | Kucera et al. . |
| 4,868,750 | 9/1989 | Kucera et al. ............... 364/419 |
| 4,984,178 | 1/1991 | Hemphill et al. ............ 364/419 |
| 5,060,155 | 10/1991 | van Zuijlen ................. 364/419 |
| 5,068,789 | 11/1991 | van Vlienbergen .......... 364/419 |
| 5,146,405 | 9/1992 | Church ........................ 364/419 |
| 5,641,264 | 2/1987 | Nitta et al. . |

OTHER PUBLICATIONS

Su et al., "Semantic and Syntactic Aspects of Score Function", Proceedings of COLING-88, ICCL, vol. 2 pp. 642–644 Aug. 1988.

Sells, P. "Lectures on Contemporary Syntactic Theories", Center for the Study of Language and Information, pp. 10–17, 77–191, 1985.

*Primary Examiner*—Robert A. Weinhardt
*Attorney, Agent, or Firm*—Townsend and Townsend Khourie and Crew

[57] ABSTRACT

A language processing system includes a mechanism for measuring the syntax trees of sentences of material to be translated and a mechanism for truncating syntax trees in response to the measuring mechanism. In a particular embodiment, a Score Function is provided for disambiguating or truncating ambiguities on the basis of composite scores, generated at different stages of the processing.

20 Claims, 11 Drawing Sheets

STA: STATIVE VERB
DEF: DEFINITE ARTICLE
LOC: LOCATION
ANIM: ANIMATE

| THE | BEAUTIFUL | ROSE | WAS | A | PRESENT |
|---|---|---|---|---|---|
| ARTICLE | ADJECTIVE | VERB | VERB | ARTICLE | VERB |
| | | NOUN | | | NOUN |
| | | | | | ADJECTIVE |

FIG. 7

| CAT-SEQ | THE | BEAUTIFUL | ROSE | WAS | A | PRESENT |
|---|---|---|---|---|---|---|
| 1 | ARTICLE | ADJECTIVE | NOUN | VERB | ARTICLE | NOUN |
| 2 | ARTICLE | ADJECTIVE | NOUN | VERB | ARTICLE | VERB |
| 3 | ARTICLE | ADJECTIVE | NOUN | VERB | ARTICLE | ADJECTIVE |
| 4 | ARTICLE | ADJECTIVE | VERB | VERB | ARTICLE | NOUN |
| 5 | ARTICLE | ADJECTIVE | VERB | VERB | ARTICLE | VERB |
| 6 | ARTICLE | ADJECTIVE | VERB | VERB | ARTICLE | ADJECTIVE |

FIG. 8

MULTIPLE SCORE LANGUAGE PROCESSING SYSTEM

The present application is a continuation in part application of application, Ser. No. 07/574,411, filed Aug. 27, 1990, now abandoned commonly assigned to the present assignee.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Field of Use

The present invention relates generally to the field of natural languages and, more particularly, to the processing of language materials for use in automated systems, such as machine translation systems, speech recognition systems, and the like.

Applications for automated recognition and/or translation of natural languages abound. Well-known examples include speech or voice recognition and machine translation. Speech recognition, for example, is the automated processing of verbal input. This permits a person to converse with a machine (e.g., a computer system), thereby foregoing the need for laborious input devices such as keyboards.

Of particular interest to the present invention is machine translation (MT), which is the automated process of translating one natural language (source language) into another (target language), such as English translated into Chinese. Machine translation quite literally has global application. To conduct world-wide business, for example, international companies must acquire and process vast amounts of data which are often written in a foreign language. In turn, these companies must also communicate with overseas concerns, including foreign companies, governments, customers, and the like. Since translation performed by human translators is a time consuming and expensive task, any automation of the process is highly desirable.

When translating natural languages, a system must process information which is not only vast, but often ambiguous or uncertain. A word in a given passage will often have a meaning which can only be discerned from its context. Consider, for example, the word "flies" in the phrases "fruit flies like a banana" and "time flies like an arrow." In the former, the word is a noun; in the latter, it is a verb. Thus the word "flies," when examined in isolation, is ambiguous since its meaning cannot be clearly discerned. Consequently, a system translating a passage of text must "disambiguate" each word, i.e., determine the best analysis for a word from a number of possible analyses, by examining the context in which the word appears. For a text passage of even modest size, this process demands significant, if not substantial, processing time and expense.

To improve the speed and accuracy of machine translation systems, several approaches have been generally adopted. For example, machine translation systems are routinely implemented in high-speed digital computers, which provide not only the necessary computational power for machine translation but also are widely available. Other efforts have focused on the actual methods employed in the translation process.

Natural language processing (NLP), for example, is an artificial intelligence method widely used in language processing systems, including MT systems, to improve the quality of the translation. The general methodology of natural language processing, which includes the steps of input, analysis, parsing, translation, and displaying/output, is set forth in further detail hereinbelow.

Fast and accurate parsing is crucial to the overall performance and quality of any MT system. In general, parsing is the stage where each sentence of the materials to be translated is parsed or broken down into simpler linguistic elements. In a simple parsing scheme, for example, the grammatical relevancy of every word within a given sentence is discerned by creating a tree-like diagram or syntax tree; every word is positioned according to its part of speech and its relationship to every other word in the sentence. To achieve a fast and accurate parse (and hence translation), the best (in a probability sense) syntax tree or output analyses having the best semantic interpretation should be rapidly attained.

It is known to improve the speed and quality of MT system by refining the parsing process. Of particular interest to the present invention is "scored truncation" parsing which employs score values for truncating or cropping unlikely paths on the basis of statistical probabilities. Since the size of the "search space" is decreased, parsing time is also reduced. The performance of a scored-truncation system, however, is closely tied to the scoring mechanism: what type of scores are generated and what method or search strategy is employed to generate them.

A score may be based on the frequency of rule usage on a set of grammar rules, i.e., a set of principles specifying the construction of syntax (or semantic) constructions. Specifically, the statistical frequency of selected rules is employed during the analysis stage for determining the best syntactic output. Several sets of grammar rules are known, including PS Grammar, Generalized Phrase Grammar (GPSG), and Lexical-Functional Grammar (LFG); see Sells, P, *Lectures on Contemporary Syntactic Theories: An Introduction to Government-Binding Theory, Generalized Phrase Structure Grammar and Lexical-Functional Grammar*, 1985.

The rule-usage frequency method has distinct disadvantages, however. Since it is concerned only with the local phenomena (i.e., without reference to context, style, mood, or the like) when applied in a global environment, it often leads to inappropriate or even incorrect language processing (e.g., translation). Another problem with rule usage frequency method (and other scoring mechanism based on rules) is the difficulty of normalizing syntactic structures of different topology. For example, a sentence may be analyzed into two syntax trees, one with more tree nodes than the other. Since a node corresponds to a phrase structure rule and is associated with a probability, whose value is always less than or equal to 1.0, the tree with more nodes will, in general, be associated with a lower probability (or score). In this case, the tree with more nodes will not be favored simply because its node number is larger, not for any grammatical reason.

Other methods and apparatus for translating natural languages are known. U.S. Pat. No. 4,502,128, for example, describes a handheld translation device. A method of operation of the device includes sectioning an input sentence into individual words; retrieving from a lexical word storage parts of speech corresponding to the individual words, thus describing the input sentence by a corresponding string of the parts of speech retrieved; transforming the string of the parts of speech of the input sentence into a corresponding string of the parts of speech for the second (target) natural language by using a translation pattern table (previously defined); and sequencing target words in accordance with sequential order of the parts of speech of the string pattern obtained after the transformation.

U.S. Pat. No. 4,586,160 describes an improved method of syntax analysis for performing the syntactic analysis of an input sentence, even when the input sentence includes words unregistered in a dictionary. When a dictionary word corresponding to an input word is registered in advance in a dictionary section, a syntactic category belonging to the dictionary word is applied to the input word. When words unregistered in the dictionary section are included in the input sequence, the application of the syntactic category based on dictionary consultation is not possible. In this case, the unregistered word is compared with the unregistered word in the input sentence by assuming from the category data prepared in advance (i.e., assumptively applying), and it is analyzed.

U.S. Pat. No. 4,635,199 describes a machine translation system where word units of a source language are translated into word units of a target language through "pivot words" of a pivot language. A pragmatic table stores pairs of pivot words and pragmatic data for each pivot word pair which defines a semantic relationship between the pivot words of the pivot word pair in different languages. During analysis, the pragmatic table is referenced to link the pivot words in pairs by relation symbols in compliance with the dominant and dependent pairs and source surface data.

U.S. Pat. No. 4,641,264 describes an automatic translation method which includes assigning parts of speech to words of an input text sentence by looking up a lexicon storage, segmenting the input text sentence, which is in the form of a string of parts of speech, into phrasal elements as minimum units having linguistic meaning to assigned parts of speech; converting the sequence of phrasal parts of speech into strings of syntactic roles to the respective phrasal elements and words; detecting patterns representing a sentence (or clause) from the sequence of syntactic roles, thereby transforming the input text sentence to a skeleton pattern represented by a combination of those patterns; transforming the sequence of the simple sentence (or clause) to the output language.

U.S. Pat. No. 4,661,924 describes a translation system including multiple parts of speech disambiguating methods. A table containing parts of speech disambiguating rules for disambiguating a part of speech of a word which includes an array of parts of speech of successive words is included. On the basis of data read from the table, parts of speech which the words are capable of functioning as multiple parts of speech are determined.

U.S. Pat. No. 4,706,212 describes a method for translation which includes scanning and comparing source words with dictionaries of source language words such that when a match is found the word under examination is stored with coded information derived from the dictionary used, where the coded information includes memory offset address linkages to a memory in the computer system where grammar and target language translations for the word are stored.

U.S. Pat. No. 4,787,038 describes a machine translation system which uses different display attributes to highlight the existence of multiple possible translations. Classes of other possibilities are displayed in accordance with a predetermined priority order.

U.S. Pat. No. 4,791,587 describes a machine translation system which displays selected senses first when the same word/phrase appears a second time; the system stores the selected senses.

U.S. Pat. No. 4,800,522 describes an interactive machine translation system where correct senses are selected and stored; the selected senses are given higher priority when they are translated a second time.

U.S. Pat. No. 4,864,501 describes a system for annotating digitally and coded text which includes lexical tagging for syntactic and inflectional features. For those words not retrieved from a dictionary, a morphological analyzer assigns tags. The analyzer than recognizes words formed by prefixation and suffixation, as well as proper nouns, ordinals, idiomatic expressions, and certain classes of character strings. The tag words of a sentence are then processed to parse the sentence.

U.S. Pat. No. 4,864,502 describes a sentence analyzer for digitally encoded text material which annotates each word of the text with a tag and processes the annotated text to identify basic syntactic units such as noun phrase and verb phrase groups to identify nominal and predicate structures. From these, clause boundaries and clause types are identified. Heuristic "weights" are employed for disambiguation.

The disclosures of each of the foregoing references are hereby incorporated by reference.

While prior art methods, particularly those employing scoring techniques, have increased the performance of machine translation systems, all have distinct disadvantages which limit their usefulness. Particularly, prior art systems have ignored certain semantic, syntactic, and lexical information which allows a system to generate a fast, accurate translation. For example, prior art systems are often based on empirical or ad hoc assumptions, and are thus unable to be generalized.

What is needed is apparatus and methods which systematically performs consistently across varying domains or fields. Such a system should be widely applicable to any language processing environment. Furthermore, the system should eliminate or truncate undesirable analyses as early as possible, thus decreasing the search space in which the system must seek a correct solution. In such a system, only the best one or two output analyses (or a few high-score candidates) are translated and passed to a post-editor for review. Thus, by eliminating ambiguous constructions that will eventually be discarded, the goals of rapid processing time and high quality output may be realized. The present invention fulfills this and other needs.

SUMMARY OF THE INVENTION

According to the present invention, a language processing system includes means for generating syntax trees of sentences of material to be translated or otherwise processed and means for truncating the syntax trees in response to the lexical, syntactic, and/or semantic information. The truncating means includes means for sequential truncation of syntax trees on the basis of scores (determined at word node positions). The scores may be compared to static or dynamic thresholds and to an accumulated lower bound.

In accordance with the present invention, field specific information, including statistical data (lexical, syntactic, and semantic data), is obtained by analysis of a master body of text or corpus which is selected to match the subject matter of the material to be translated. In a particular embodiment, a Score Function is provided for disambiguating or truncating ambiguities on the basis of composite scores, generated at different stages of the processing. Lexical, syntactic, and/or semantic scores may be employed alone or as a composite value at different stages of the processing to meet the particular requirements of disambiguation at each stage.

BRIEF DESCRIPTION OF THE DRAWINGS

FIG. 7 is a table illustrating a lexical ambiguity table.

FIG. 8 is a table illustrating all possible lexical combinations for the lexical ambiguity table of FIG. 7.

DETAILED DESCRIPTION

Introduction

Figure 1:
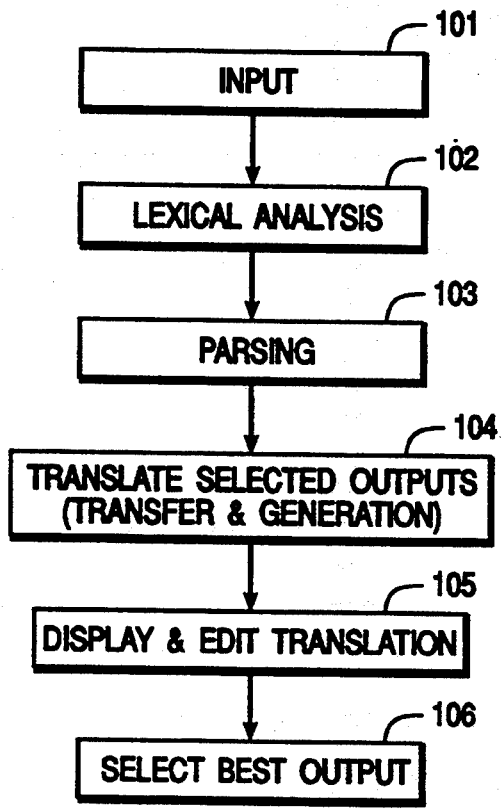
FIG. 1 is a flow chart of the general operation of a conventional machine translation system.

Referring now to FIG. 1, the overall process 1 of a conventional machine translation system is illustrated. The process include input 101, lexical analysis 102, parsing 103, translating 104, displaying/editing 105, and output 106 steps. The steps will now be described in further detail.

In step 101, materials to be translated are entered or inputed into a translation system. These textual inputs may be entered into the system by any conventional means, as is known in the art.

In step 102, a lexical analysis is performed by "tokenizing" each sentence of the input. Specifically, each sentence is broken down into simpler, meaningful linguistic tokens or units. Tokens, which include words, idioms, and the like, are initially determined by the location of delimiters, including whitespace characters (e.g., space, tab, and carriage return characters) and punctuations. Next, lexical information for each token is derived from one or more lexicons. In particular, a dictionary lookup is performed for each token to determine its part(s) of speech.

In step 103, each sentence is "parsed" by determining the grammatical relationship between its elements. In particular, syntactic and semantic analyses are performed by comparing each source or input sentence against known grammar rules, including rules of semantic constraints. The role of subjects and objects in each sentence is identified, and their actions and attributes are represented (e.g., by a "tree" data structure having a plurality of branches). Ideally, lexical, syntactic, and semantic ambiguities in the materials to be translated are resolved in this step. Those analyses which appear most likely to be correct, i.e., candidate parser output analyses, are stored for further processing by the system.

In addition to the foregoing rule-based parsing, it is known to employ a "score function" in the parsing step for measuring the quality of candidate syntax trees. See, e.g., Suet al., *Semantic and Syntactic Aspects of Score Function, Proceedings* of. COLING-88, 12th International Conference on Computational Linguistics, International Committee on Computational Linguistics (ICCL), Budapest, Hungary, vol. 2, pp. 642-644, Aug. 22-27, 1988.

At step 104, the parse outputs are translated by substituting target language elements for their source language equivalents. In a simple system, for example, a word-for-word substitution between the source and target languages is made. At the conclusion of step 104, the translated output(s) is available for further refinement by a human reviewer (step 105). Finally, in step 106, the final translated output is selected and made available for printing, storage, transmitting, additional processing, and the like.

Preferred Embodiments

Figure 2:
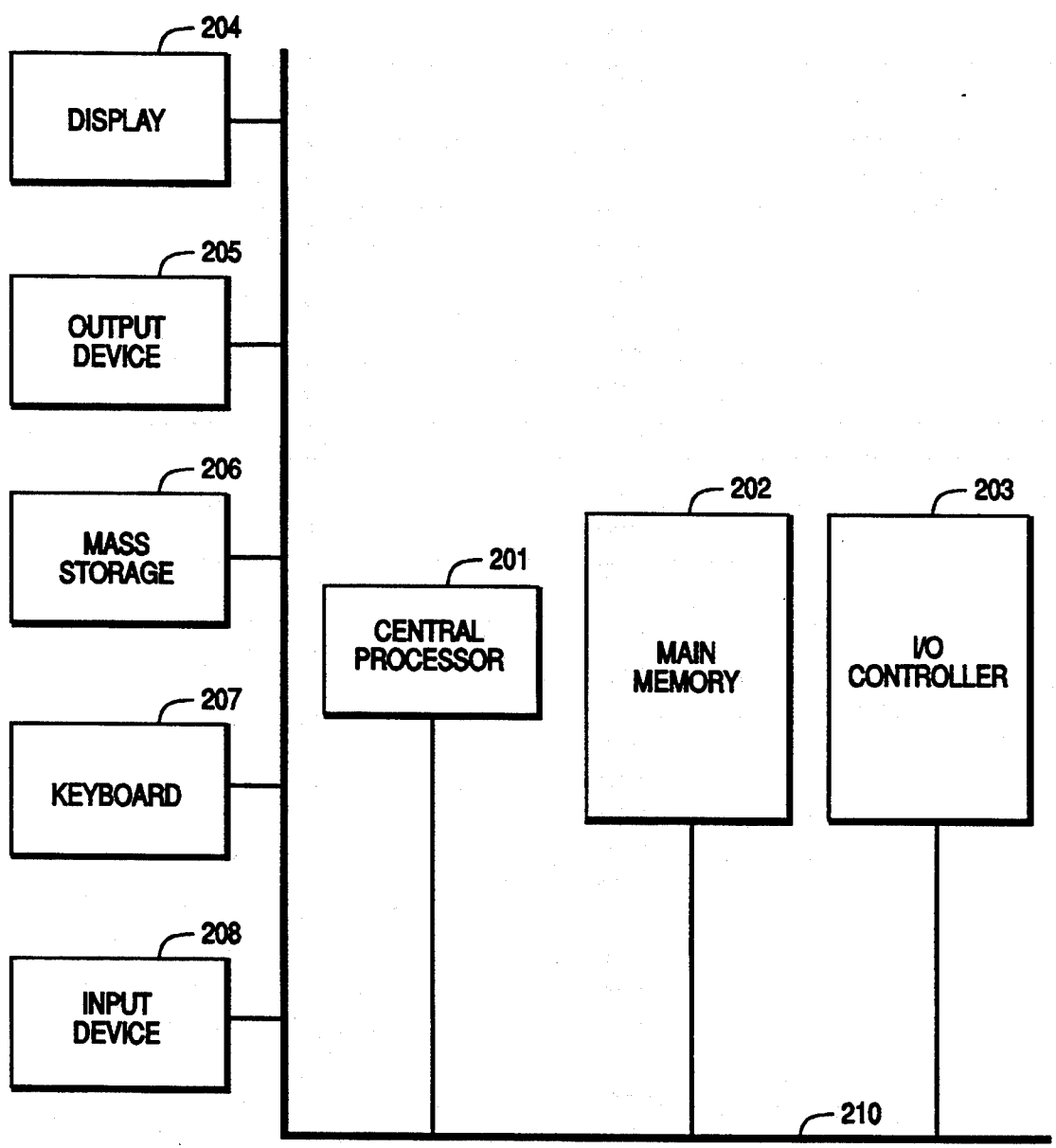
FIG. 2 is a block diagram of a computer system in which the present invention may be embodied.

Referring now to FIG. 2, a computer system 2 in which the present invention may be embodied is shown. Computer system 2 comprises a central processor (CPU) 201, a main memory 202, an I/O controller 203, and a bus architecture 210 through which the various components of system 2 are interconnected.

System 2 also includes additional input and output devices: a display 204 (e.g., an LCD or CRT screen), an output device 205 (e.g., a printer, a communication port, or the like), a mass storage device 206 (e.g., a magnetic, optical, and/or magneto/optic disk drive), and a keyboard 207. An additional input device(s) 208, such as a scanner with optical character recognition (OCR) capability, may also be provided.

Those skilled in the art will appreciate that other apparatus may serve as the output device 205 or the input device 208. For example, output device 205 may include a SCSI interface, an RS-232 port, or the like. Similarly, input device 208 may include a pointing device, such as a mouse or a trackball, and the like.

The basic operation of system 2 is as follows. The central processor 201 executes a sequence of instructions in the form of application and/or system programs, which are typically loaded into the main memory 202 from the mass storage 206. System 2 receives additional instructions, such as user commands, from the keyboard 207 and/or the input device(s) 208. These instructions are processed by the central processor 201, and results are displayed to the user via display 204. Results may also be supplied as output through output device(s) 205. In a preferred embodiment, system 2 is an appropriately programmed SPARC-compatible workstation running under the UNIX operating system, both of which are available from a number of vendors including Sun Microsystems of Mountain View, Calif.

Figure 3A:
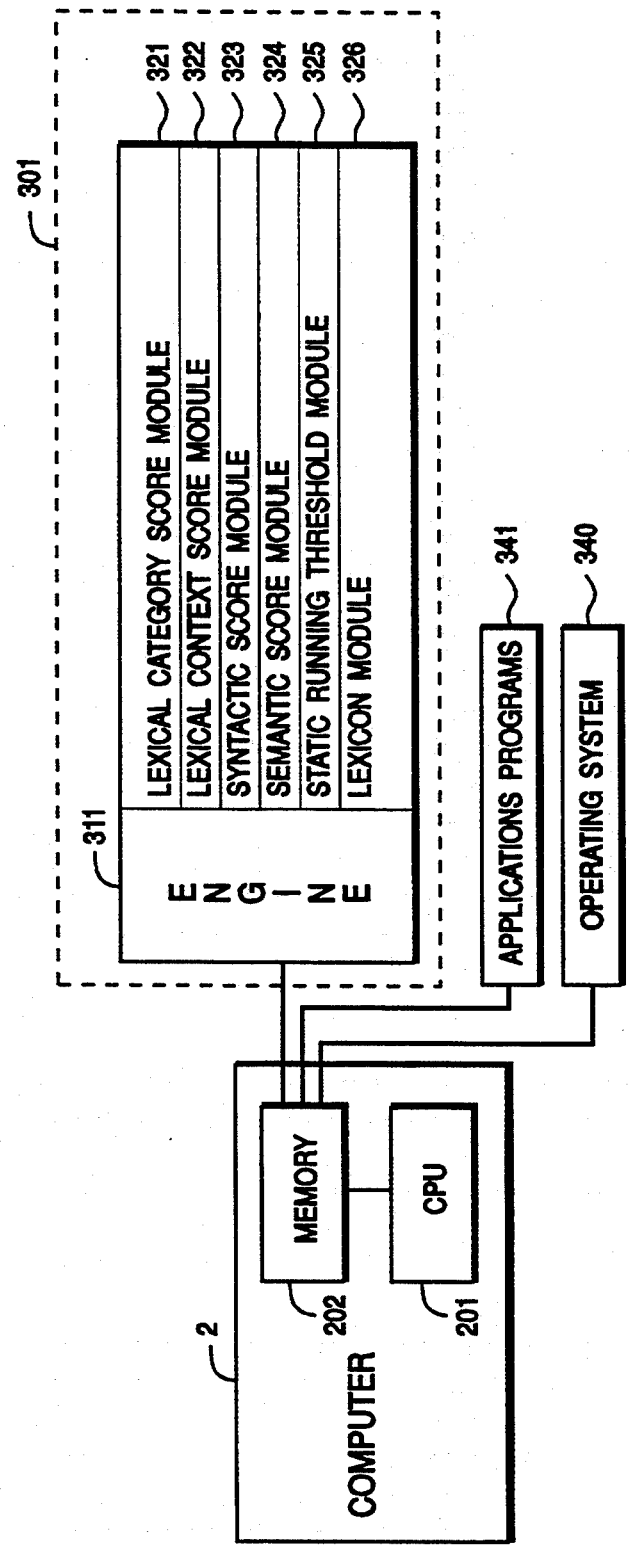
FIG. 3A is a block diagram of a language processing system of the present invention.
Figure 3B:
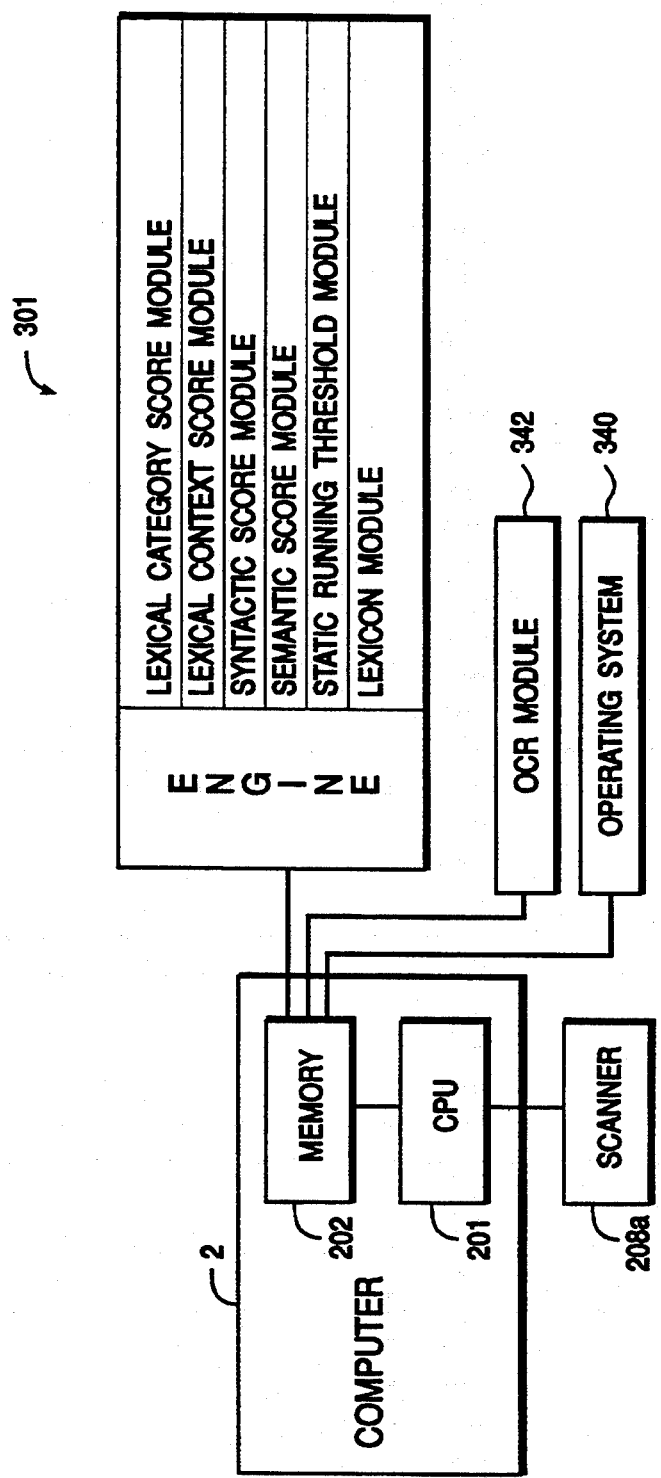
FIG. 3B is a block diagram of a first alternative embodiment of the present invention.
Figure 3C:
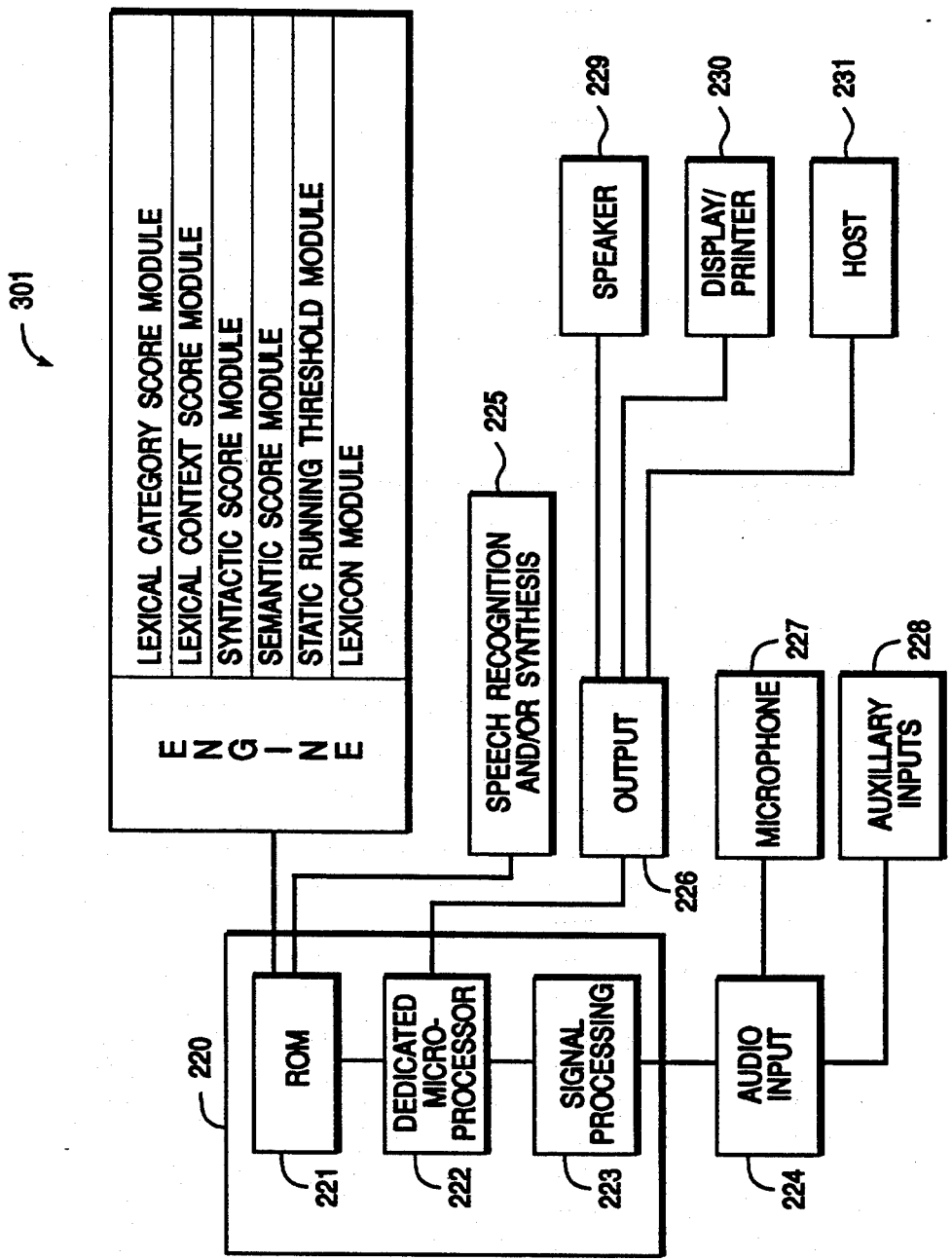
FIG. 3C is a second alternative embodiment of the present invention.

Referring now to FIGS. 3A–3C, language processing systems constructed in accordance with the principles of the present invention will be described. As shown in FIG. 3A, a machine translation system 3 of the present invention comprises the computer system 2 and a translation subsystem 301. The translation subsystem 301 includes an interface 310, an engine or control component 311, and a plurality of modules 321–326. The plurality of modules 321–326 are operably coupled to the engine 311 which, in turn, is coupled to the interface 310. In operation, the translation subsystem 301 is typically stored in the memory 202, where it may direct the operation of CPU 201. In addition, system 3 operates under the control of operating system 340, which is also typically stored in memory 202. Other applications, such as applications programs 341 (e.g., a word processor), may be stored in memory 202 for execution by CPU 201.

Referring now to FIG. 3B, an alternative embodiment of the system 3 is shown. A machine translation system 4 of the present invention includes the previously described computer 2 (operating under the operating system 340) and the translation system 301. In addition, the system 4 includes a scanner 208a, operably coupled to the CPU 201, for providing bitmap images of textual materials to the computer 2, as is known in the art. Scanner 208a may be a flatbed or handheld scanner, which is available from several vendors including Hewlett-Packard of Palo Alto, Calif. System 4 also includes an optical character recognition (OCR) module 342, also typically stored in the memory 202.

Referring now to FIG. 3C, a third embodiment of the present invention is illustrated. A speech recognition system 5 of the present invention includes a speech recognition module 220 and the translation subsystem 301. The speech recognition module 220 includes a firmware or ROM (read-only memory) 221, a dedicated microprocessor 222, and a signal processing module 223. The translation module 301 is typically stored in the ROM 221; also, a speech recognition and/or synthesis module 225 is stored in the ROM 221. The ROM 221, in turn, is operably coupled to the dedicated microprocessor 222 and directs its operation. The overall operation of the speech recognition system 220 is controlled by the microprocessor 222 executing instructions in ROM 221.

In addition to receiving input and instructions from ROM 221, the dedicated microprocessor 222 receives input from the signal processing unit 223, which provides the system 220 with digital audio signals. Particularly, signal processing 223 receives analog audio signals from an audio input 224 and provides digital audio signals to the microprocessor 222. Signal processing 223 typically includes an analog-to-digital converter (ADC) for converting the analog audio signals into corresponding digital signals, as is known in the art. Audio input 224, in turn, receives the analog signals from a microphone 227 and/or auxiliary inputs 228. Those skilled in the art will appreciate that preformatted digital audio, such as that available in CDDA or CD-ROM formats, may also be provided to the speech recognition system 220.

Output from the speech recognition module 220 is provided to an output unit 226, which is operably coupled to the microprocessor 222. Output 226 provides digital and/or analog output signals to external apparatus, such as a speaker 229, a display and/or printer 230, or another host computer 231.

Translation Subsystem

According to the present invention, the quality of a language processing system is greatly improved if unwanted (i.e., ambiguous) output analyses are eliminated from processing as early as possible. In particular, the process of selecting parser outputs, such as step 104 of FIG. 1, is augmented if there are fewer ambiguous output analyses for selection. Further performance gains are realized if preferred structures are ranked higher than less preferred ones. Thus, according to the present invention, improved quality and efficiency in a machine translation system are obtained by improving the evaluating or measuring method for disambiguating the output analyses before and during the selection process.

The following discussion will focus on the operation of the translation subsystem 301 in a machine translation system of the present invention, such as the system 3. The present invention presented, however, is not limited to the methods and apparatus of such a system, but instead may be advantageously applied to a variety of other language processing systems, including speech recognition and synthesis systems.

A. Modules

Referring again to FIG. 3A, the plurality of modules of system 3 includes a Lexical Category Score module 321, a Lexical Context Score module 322, a Syntactic Score module 323, a Semantic Score module 324, a Static Running Threshold module 325, and a Lexicon module 326. Each will now be described.

The Lexical Category Score module 321, the Lexical-Category Context Score module 322, the Syntactic score module 323, the Semantic Score module 324, and the Static Running Threshold module 325 all include field or topic-specific information, including statistical data, for the text to be translated. More particularly, analyses of a master body of text, having the same or similar field as the text to be translated, are incorporated in these modules. Exemplary fields include computer science, medicine, physics, politics, religion, and the like. A default or general body of text is also provided and may be employed when the field of the input material is general or cannot be identified. As a particular advantage of the present invention, the use of field-specific statistical data greatly improves the performance and accuracy of the translation.

In a preferred embodiment, the field-specific information includes probability data, such as the frequency of occurrence of related events in the master text for the related field. For ease of computation, probability data may be stored in the module as the logarithm of the probability. Those skilled in the art will appreciate other statistical determinants, in addition to frequency of occurrence, which may be employed as indicia relating the source material to the master text.

The Lexical Score modules, which simplify the selection of lexical categories of words to be translated, may be divided into the Lexical Category Score module 322 and the Lexical Context Score module 322. The Lexical Category Score module 321 examines a word and its category (part of speech) from the Lexicon; module 321 returns information, such as a score, indicating the likelihood of such a construction. Those skilled in the art will appreciate that a variety of formats, other than scores, may also be employed to convey this information; for example, the information may be encoded as facts which are then asserted into a knowledgebase.

Access into the module 321 is as follows. For each source word ($w_i$), module 321 includes at least one record having at least two fields. In one field, a category ($c_i$), such as a part of speech or the like, for the word ($w_i$) is defined. The other field represents the probability that such a category use (e.g., as a particular part of speech) of the word exists in the master text or corpus. Thus a category score may be based on the probability data, such as the frequency of occurrences of such category uses in the master text. Thus, the probability (P) that the word ($w_i$) will have the category ($c_i$) may be expressed as a score derived from or ($Pw_i|c_i$). Alternatively, the data may be based on arbitrary values, such as ones selected by a linguistic expert. In either case, module 321 determines the category probability for each source word.

The Lexical Context Score module 322, on the other hand, is accessed by lexical categories from the source material. In particular, a string (or other data structure) having a context of one ($c_i$) category and one or more local categories (e.g., neighboring categories $c_{i-2}, c_{i-1}$) is employed; respective probabilities for the categories are identified by module 322. From these inputs, module 322 determines the frequency of occurrence or probability (P) of the category ($c_i$) having such a context in the master text. Thus, the probability (P) that category ($c_i$) will have the surrounding n categories ($c_{i-n}, \ldots, C_{i-2}, c_{i-1}$) may be expressed as $P(c_i|c_{i-n}, \ldots, c_{i-2}, c_{i-1})$.

The Syntactic Score module 323 is employed to select the most likely syntactic analyses (within known lexical categories) for the input texts. The Syntactic Score module 323 is accessed by a string consisting of the parts of speech assigned to source words and to selected syntactic categories (including function-value pairs, such as noun phrase (NP), verb phrase (VP), and the like) which are available (from the currently parsed syntactic substructures). Unlike lexical categories (such as parts of speech), syntactic categories may include nonterminal nodes (e.g., noun phrases (NP) or verb phrases (VP)) and thus be divided into additional levels.

The strings examined by module 323 (obtained at the current step of analysis) may include a word under examination, some words or syntactic categories to the left of that word, and some words to the right for a total of some preselected number of words and/or syntactic categories. From these inputs, the module 323 determines a score or probability of occurrence of the supplied string in the master text.

As the size of the master text increases, the amount of context information (i.e., number of neighboring categories) referenced will typically be increased. Also as the size of the master text expands, the probability data (used to determine the scores) becomes adequately significant, thus enabling the number of context symbols referenced for syntax to be more flexibly chosen. For instance, if three context symbols (two left and one right) are to be referenced, the access string for the Syntactic Score module will include the lexical category of the word under examination, the lexical or syntactic categories of two terms to the left of that word, and the lexical category of the word to the right for a total of four lexical or syntactic categories.

The Semantic Score module 324 improves the process of selection by deriving an appropriate semantic annotation when the lexical categories and the syntactic analyses of the input text are known. A semantic annotation is the tagging of a word with particular semantic features. The Semantic Score module 324 is accessed by semantic feature(s) assigned to both the words under consideration and the syntactic categories of the constructed syntactic structures. Examples of semantic features are verbs of location, such as "locate"; verbs of production such as "write" and "build"; nouns of position such as "park" "New York", and the like. Since disambiguation has, to a large extent, already been performed by the Lexical and Syntactic modules, only a few semantic features need be employed. The accessing method for the Semantic Score module 324 is similar to the previously described method for accessing the Syntactic Score module 323 which also considers the context terms. However, the semantic features of the word under examination and the semantic features of its context words or syntactic categories are also examined.

The Static Running Threshold module 325 represents a floor or threshold which may be used during parsing to truncate unlikely paths. It is accessed by a word position or index of the word under examination; it may be derived from the semantic and syntactic scores (as described hereinbelow). For instance, a running threshold of two is the threshold for the product of the semantic and syntactic scores of the structure constructed so far for the first two words of the input text. Since the values are constant (or held to a preselected set), the running thresholds in the module 325 are termed "static" running thresholds. As described hereinbelow, however, the running thresholds may be dynamic, i.e., adjusted during operation, to "fine tune" the analysis process.

B. Engine: Score Function

Engine 311 performs the actual language processing of subsystem 301. The construction and operation of the engine 311 are best understood by examining a score function of the present invention, which forms an integral part of the engine. An interpretation of a sentence may be constructed from the semantic annotation, the syntactic structure, and the lexical category sequence selected. The quality of the interpretation or the score can be expressed quantitatively as the probability of an input having a particular semantic annotation, a particular syntactic structure, and a particular lexical category sequence. Thus, engine 311 employs the score function to measures the degree of well-formedness or quality of a semantically annotated syntax tree. The score function employs a score mechanism based on conditional probability, with better analyses selected on the basis of their scores. The score function of the present invention can be represented succinctly by the following equation:

$$\text{SCORE}(\text{Sem}_i, \text{Syn}_j, \text{Lex}_k, \text{Words}) = P(\text{Sem}_i, \text{Syn}_j, \text{Lex}_k | \text{Words}) \quad \text{Eq. 1}$$

where $\text{Sem}_i$, $\text{Syn}_j$, and $\text{Lex}_k$ are the particular semantic annotation, syntactic structure, and lexical information attached to a given ambiguous construction for the input "Words".

As shown in Equation 2 below, the score of an interpretation can be expressed as the product of three scores: a semantic score, a syntactic score, and a lexical score. The semantic score is the conditional probability of a semantic annotation based on the syntactic structure, the lexical category sequence, and the input words. The syntactic score is a conditional probability of a syntactic structure based on the lexical category sequence and the input words. The lexical score is the conditional probability of a lexical category sequence based on the input words.

A particular feature of the score function of the present invention is its accuracy when used as a measure of well-formedness for semantically annotated syntax trees. With reasonable assumptions, the function meets a minimal cost optimal criteria of Baysian decision rule. Thus, the best analysis of a sentence with minimal cost is equivalent to finding the semantic annotation ($Sem_i$), syntactic structure ($Syn_j$), and lexical categories ($Lex_k$), which, in combination, maximize the conditional probability expressed in the following equation (for the given surface or input strings "Words"):

$$\begin{aligned}
\text{SCORE} \\
(Sem_i, Syn_j, Lex_k, \text{Words}) 
\end{aligned} \quad \begin{aligned}
&= P(Sem_i, Syn_j, Lex_k | w_1 \ldots w_n) \\
&= P(Sem_i | Syn_j, Lex_k, w_1 \ldots w_n) * \\
&\quad P(Syn_j | Lex_k, w_1 \ldots w_n) * \\
&\quad P(Lex_k | w_1 \ldots w_n) \\
&= \text{SCORE}_{sem}(Sem_i) * \\
&\quad \text{SCORE}_{syn}(Syn_j) * \\
&\quad \text{SCORE}_{lex}(Lex_k)
\end{aligned} \quad \text{Eq. 2}$$

where $w_1 \ldots w_n$ represent words in a given sentence, and the last three product terms represent the semantic score, the syntactic score, and the lexical score, respectively.

Another particular feature of the score function is independence among its three component scores. Thus, a part of the score function (e.g., lexical score for the lexical category disambiguation) may be singularly used; alternatively, different means of design schema for each component score may be adopted in order to attain overall improvement of the system.

1. Lexical Score

The lexical component or score of the score function, i.e., $\text{SCORE}_{lex}(Lex_k)$ (or $P(Lex_k | w_1 \ldots w_n)$), will now be described. The lexical score can be expressed as the product of probability for each word to take on or assume its preferred category (or part of speech). More particularly, the probabilities express the likelihood of a word having a particular category, given the current input and the categories selected for prior words (i.e., those before the current one).

Various techniques may be employed for simplifying the lexical score. For example, the lexical score may be simplified by examining only the context information near the current word. Further simplification may be achieved by reducing the joint probability (of multiple categories) to two—one for the contextual lexical categories, the other for the input word.

The lexical score may be derived by approximation techniques. The lexical score can be approximated by a transformation function derived from the Lexical Category Score and the Lexical Context Score. The lexical score is the transformation based on the conditional probability of a lexical category having a set of contextual lexical categories for the preceding words and the conditional probability of a word being associated with a lexical category. By way of illustration and not limitation, the lexical score is shown by the following Equation 3, where the number of reference context (i.e., context terms referenced) is set to two (for simplicity):

$$\begin{aligned}
\text{SCORE}_{lex}(Lex_k) &= \prod_{i=1}^{n} P(c_i | c_1^{i-1}, w_1^n) \\
&\approx \prod_{i=1}^{n} P(c_i | c_{i-j}^{i-1}, w_1^n) \\
&\approx \prod_{i=1}^{n} f(P(c_i | c_{i-2}, c_{i-1}), P(w_i | c_i))
\end{aligned} \quad \text{Eq. 3}$$

where, $w_1^n$ means $w_1, w_2, \ldots, w_n$ (adopted herein to refer to a sequence of words or lexical categories, and the like), f is the transformation function based on the two lexical conditional probabilities, $w_i$ is the i-th word, and ($c_i$, $c_{i-2}$, $c_{i-1}$) are the category for the i-th word and the categories for the two words ahead of the i-th word, respectively. The number of reference context, however, can assume other values, provided selectional power of the lexical score is improved as well.

The transformation function f may be linear such that the lexical score can be written as the product of the weighted sum of the two probabilities and, thus, may be expressed by the following equation:

$$\text{SCORE}_{lex}(Lex_k) \approx \prod_{i=1}^{n} [\lambda_1 P(c_i | c_{i-2}, c_{i-1}) + \lambda_2 P(w_i | c_i)] \quad \text{Eq. 4}$$

where, $\lambda_1$ and $\lambda_2$ are the weightings computed from the corpus. In particular, if $\lambda_1 + \lambda_2 = 1$, the weighted sum can be regarded as an approximation of the unsimplified conditional probability expressed in Eq. 3. Thus, the approximation is a linear interpolation of the Lexical Category Score and the Lexical Context Score. Alternatively, the function f may be nonlinear, whereby the lexical score is expressed, for example, as a nonlinear function:

$$\text{SCORE}_{lex}(Lex_k) \approx \prod_{i=1}^{n} [P(c_i | c_{i-2}, c_{i-1})^{\alpha_1} \times (pw_i | c_i)^{\alpha_2}] \quad \text{Eq. 5}$$

where, $\alpha_1$ and $\alpha_2$ are the parameters computed with the corpus.

For the special case where $\alpha_1 = 1 - \lambda$ and $\alpha_2 = \lambda$, for some lexical weighing $\zeta$, Equation 5 may be represented in a "nonlinear smooth form." In this case, the parameter $P(c_i | c_1^{i-1}, w_1^n)$ is estimated in a transformed parameter space employing linear interpolation, as shown by the following equation:

$$\begin{aligned}
g(P(c_i | c_1^{i-1}, w_1^n)) = &\lambda g \\
&P | (w_i | c_i) + (1-\lambda) g(P_2(c_i | c_{i-s}^{i-1}))
\end{aligned} \quad \text{Eq. 5a}$$

where g is a selected transformation function. In a preferred embodiment, g is a logarithmic (base$_{10}$) function. Those skilled in the art will appreciate that g may be other transformation functions, such as cosine, natural log, and the like.

The two parameter sets (corresponding to $P_1$ and $P_2$) of Equation 5a are weighted differently according to the degree of reliability of the two sets (when used to estimate P). The formulation of Equation 5a may be referred to as a nonlinear smooth form since a nonlinear function (e.g., logrithmic) is used to transform the parameter space, with two parameter sets transformed to that space. As a result, the parameter sets are "smoothed" and, thus, provide an estimate of the required parameter set.

2. Syntactic Score

The syntactic component or score of the score function, i.e., $\text{SCORE}_{syn}(\text{Syn}_j)$, will now be described. The syntactic aspect may be approximated by the conditional probability of a syntactic structure having the given lexical category sequence, as expressed, for example, by the equation:

$$\text{SCORE}_{syn}(\text{Syn}_j) = P(\text{Syn}_j | \text{Lex}_k) = P(\text{Syn}_j; c_1 \ldots c_n)$$

where, $c_1$ to $c_n$ are the lexical categories corresponding to the words $w_1$ to $w_n$.

Figure 4:
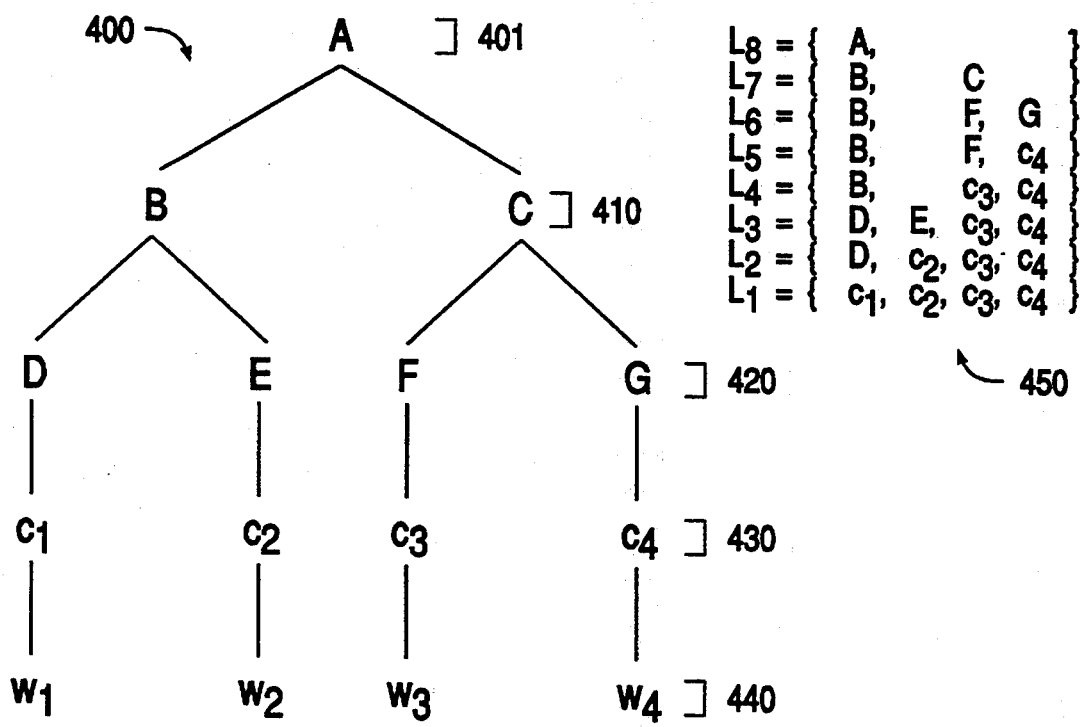
FIG. 4 is a tree diagram illustrating the syntax structure and phrase levels of a hypothetical sentence of four words, $w_1$-$w_4$.

Referring now to FIG. 4, a mechanism for deriving the syntactic score is illustrated. FIG. 4 represents a syntax tree 400 having a plurality 450 of reduction sequences $L_1$ to $L_8$ (produced by bottom-up parsing). Specifically, the syntax tree 400, which comprises a sentence of four words ($w_1$–$w_4$), can be decomposed into a plurality of phrase levels which correspond to the reduction sequences 450. A phrase level is a set of terminal and nonterminal nodes that appear at a step of the parsing process where the reduction sequence $L_i$ is the i-th phrase level and the transition from a phrase level $L_i$ to the next phrase level $L_{i+1}$ corresponds to a reduction of some terminals or nonterminals at time $t_i$. For example, the transition from $L_1$ to $L_2$ represents the reduction of $C_1$ to D.

The syntactic score may be formulated as the product of the conditional probability of a phrase level being reduced (into the next level), given the previous sequence of phrase levels (e.g., level 3 reducing into level 4). These individual probabilities may be simplified into conditional probabilities of a phrase level based on the immediately preceding phrase level (e.g., level 3). Thus, the syntactic score may be rewritten into the conditional probability of a given symbol being reduced into the next level, based on the given reducing symbols and their left and right contexts.

The syntactic score of the syntax tree 400 can be formulated as the following conditional probability equation:

$$\text{SCORE}_{syn}(\text{Syn}_A) = P(L_8, L_7 \ldots L_2 | L_1) \quad \text{Eq. 6}$$

$$= P(L_8 | L_7 \ldots L_2, L_1) * P(L_7 | L_6 \ldots L_1) *$$

$$\ldots P(L_2 | L_1)$$

$$\approx P(L_8 | L_7) * P(L_7 | L_6) * \ldots * P(L_2 | L_1)$$

$$\approx P(\{A\} | \{l_7, B, C, r_7\}) *$$

$$P(\{C\} | \{l_6, F, G, r_6\}) *$$

$$\ldots * P(\{D\} | \{l_1, c_1, r_1\})$$

where, $l_i$ and $r_i$ are the left and right contexts of the reducing symbols. The product terms in the formula correspond to the sequence of rightmost derivation. Therefore, such formulation is especially useful for LR parsing. Those skilled in the art will appreciate, however, that the phrase levels can be defined otherwise, according to the parsing mechanism adopted. Accordingly, the technique is not limited to LR parsing but can be generalized to all other parsing mechanism.

If only one left and one right context symbol are considered, Equation 6 can be further reduced to the following equation:

$$\text{SCORE}_{syn}(\text{Syn}_A) \approx \quad \text{Eq. 7}$$

$$P(\{A\} | \{0, B, C, 0\}) * P(\{C\} | \{B, F, G, 0\}) * \ldots *$$

$$P(\{D\} | \{0, c_1, c_2\})$$

where, "0" represents NULL. Thus with the reducing symbols with left and right context being limited in size to 1, the syntactic score is the resulting product of the conditional probability of a symbol being reduced into the next level.

When only a transition immediately after a word fetch is considered, multiple reduction phrase levels between word fetches may be compacted into one event, and the conditional probability terms are reduced to the conditional probability of one event occurring based on all the phrase levels before it. The probability terms may be simplified by reducing the conditional phrase level into the immediately preceding phrase level before the word fetch. Further simplification may be achieved by approximating the compacted reduction phrase levels with just the latter-most phrase level (which is possible since every preceding phrase level contributes to the reduction into this latter-most phrase level). Hence, the syntactic score can be rewritten as the conditional probability of a phrase level being reduced at the word-fetch step. Thus, to calculate the score at the point where a word is just being fetched during an LR parsing process (i.e., to compact multiple reductions and one shift into one step), the $\text{SCORE}_{syn}(\text{Syn}_A)$ can be formulated alternatively by the equation:

$$\text{SCORE}_{syn}(\text{Syn}_A) = P(L_8, L_7 \ldots L_2 | L_1) \quad \text{Eq. 9}$$

$$= P(L_8, L_7, L_6 | L_5 \ldots L_1) * P(L_5 | L_4 \ldots L_1) *$$

$$P(L_4, L_3 | L_2, L_1) * P(L_2 | L_1)$$

$$\approx P(L_8, L_7, L_6 | L_5) * P(L_5 | L_4) * P(L_4, L_3 | L_2) *$$

$$P(L_2 | L_1)$$

$$\approx P(L_8 | L_5) * P(L_5 | L_4) * P(L_4 | L_2) * P(L_2 | L_1)$$

where the phrase level pairs in the above equation (e.g., $L_2$ and $L_4$) correspond to the stack content before and after an input word is fetched. Such a formulation makes run-time score computation an easy task because the probability entries can be computed one at a time by monitoring the changes in the stack content of the LR parser after an input word is shifted.

3. Semantic Score

The semantic component or score of the score function, i.e., $\text{SCORE}_{sem}(\text{Sem}_i)$, will now be described. The semantic aspect may be approximated by the conditional probability of a semantic annotation based on a syntactic structure, and expressed by the equation:

$$\text{SCORE}_{sem}(\text{Sem}_i) \approx P(\text{Sem}_i | \text{Syn}_j)$$

where $\text{Sem}_i$ is the i-th semantic annotation corresponding to the j-th syntactic structure, $\text{Syn}_j$. Alternatively, the semantic score may be expressed as:

$$\text{SCORE}_{sem}(\text{Sem}_i) \approx \prod_{l=1}^{m} P(\{sem_{l,1} \ldots sem_{l,n}\}_l | PR_l) \quad \text{Eq. 9}$$

where, $\{sem_{l,1} \ldots sem_{l,n}\}$ are a set of semantic features corresponding to the left-hand side symbols of the given set of production rules, $PR_l$, for $l=1$ to m phrase levels.

The number of semantic features retained for each term may vary. For context-sensitive modeling, the semantic score, with a n-tuple semantic feature set retained for each term, can be expressed by the equation:

$$\text{SCORE}_{sem}(\text{Sem}_i) \approx \prod_{l=1}^{m} P(\{sem_{l,1} \ldots sem_{l,n}\}_l | \bar{\alpha}_l^L PR_l \bar{\beta}_l^R) \quad \text{Eq. 10}$$

where $\bar{\alpha}_1^L$ and $\bar{\beta}_1^R$ are the immediate annotated left context and right context symbols.

Figure 5:
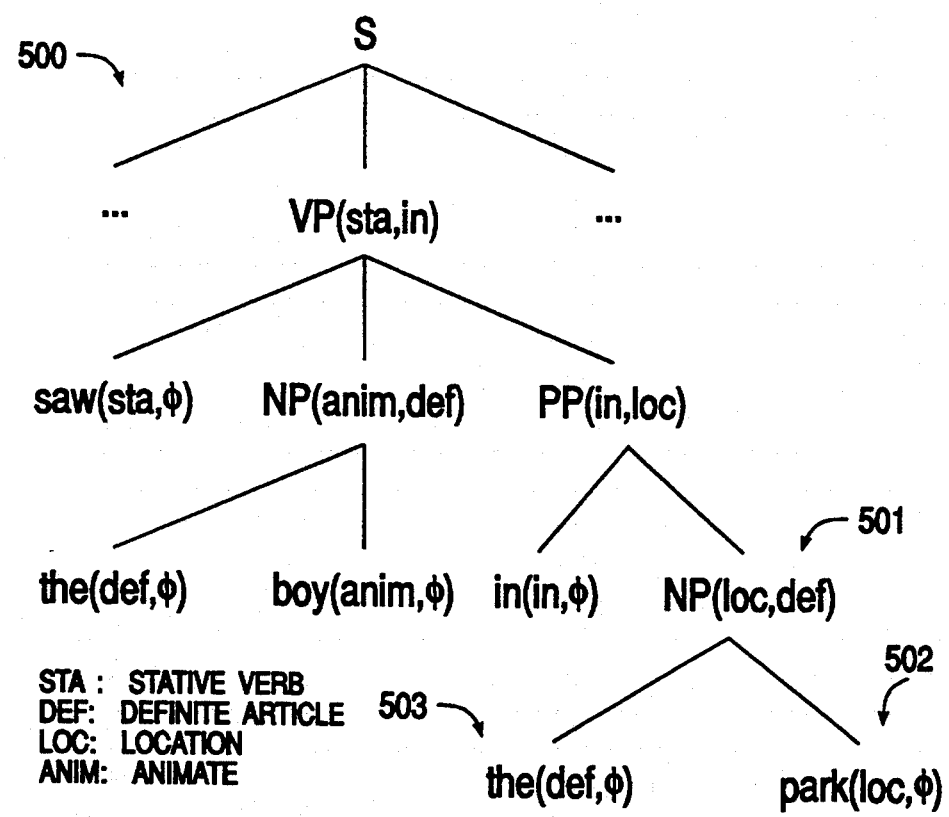
FIG. 5 is a tree diagram illustrating a semantically annotated syntax structure of the phrase "saw the boy in the park."

Referring now to FIG. 5, an exemplary semantically annotated syntax structure 500 for the verb phrase of "saw the boy in the park" where each node has a set of two-tuple semantic features, is shown. The percolation of the semantic features starts from the lowest level and percolates upward. For example, the rightmost "NP" (noun phrase) node 501 has two features of "loc" (location) and "def" (definite) in its feature set. The "loc" feature came from the feature set for the word "park" 502. The "def" feature came from the feature set for the word "the" 503.

In general, the feature sets of the siblings are combined to form the feature set for the mother node. In addition, the features in the new set are ordered such that the most important feature is placed in the front of the set. The reason is that if the number of the features in the new set exceeds the predetermined number of features to be retained, the more important features at the front can be saved and percolated upward when the excess features are ignored.

The semantic score computation is similar to the computation procedure for the syntactic score. The difference is that each phrase level is now replaced with an annotated phrase level. Although those annotated phrase levels contain the same terminal and nonterminal nodes as their corresponding phrase levels as before, each node now has a set of semantic features that were percolated from the semantic features associated to the words that comprise the node.

4. Adaptive Learning, Discrimination and Robustness Enhancement for the Scoring Mechanism The various (conditional) probabilities (hereinafter, the parameters for the scoring mechanism) in the previous sections can be estimated from a master text (i.e., a text corpus). The general approach to estimate such probabilities is to divide a frequency of occurrence of an event at a given condition by the frequency of occurrence of any event at the same given condition. For example, the frequency of occurrence of one phrase level being reduced from a known phrase level is divided by the frequency of occurrence of any phrase level being reduced from the same known phrase level to estimate the transition probability required for syntactic score. Such an estimation method is known as the Maximum Likelihood Estimation.

The set of probabilities estimated in this way ensures that the probability of occurrence of the joint events in the text corpus are maximized with respect to other sets of probabilities estimated with other methods. However, maximum 'likelihood' does not imply minimum 'error rate' when the set of probabilities are used to evaluate the scores of the ambiguous analyses of the sentences in the master text. It is possible to have a reasonably small error rate, through.

Furthermore, since the statistical characteristics of the input sentences might not be the same as the master text, it does not guarantee that the accuracy rate will reach the maximum when this set of parameters (probabilities) are used for scoring the annotated structures of the input sentences.

It is most desirable, in fact, to have a discriminative scoring function, namely a function that could reach minimum error rate for the input namely a function that could reach minimum error rate for the input sentences, when designing a scoring mechanism. Furthermore, it is desirable to be robust enough so that the statistical variations between the master text and the input sentences do not affect the system performance too much.

An advantage according to the present invention is that a systematic approach can be used to adjust the initial parameters (probabilities) to enhance the discrimination power and robustness of the system. This capability is unlikely to be found in a rule-based system. The following paragraphs will show how to enhance the discrimination power and robustness of the scoring mechanism.

To enhance the discrimination power of the scoring mechanism, first an estimation method, like maximum likelihood estimation, can be used to estimate an initial set of parameters. The set of parameters is then used to determine the lexical categories, syntactic structures and semantic features for the sentences in the master text. If the determined information is not the correct one (which is already known since the master text is already correctly annotated), then the parameters for the correct (yet not highest-scored) annotated syntax tree are raised by a fixed amount, and the parameters for the one with the highest score (yet not the correct one) are reduced by the same the highest score (yet not the correct one) are reduced by the same amount. With this approach, th parameters, which result in error, can be compensated by lowering the over-estimated parameters and raising the under-estimated ones; the adjusted parameters thus improves the discrimination power of the scoring mechanism to the master text.

The above adjustment steps can be iteratively applied to each sentence in the master text to acquire increasingly better parameters. In addition, th amount of adjustment can be changed in different iterations, for instance, by reducing the amount of adjustment with an exponential rate. Those skilled in the art will appreciate that other time functions can also be used to control the amount of adjustment. The above adjustment steps can be repeated until the performance with a new set of parameters achieves maximum, achieves an expected performance or converges. The new set of parameters will then provide a better discrimination power for scoring than the initial one.

To reduce the effects introduced by the statistical variations between the master text and the input sentences, the following steps could be used to further enhance the robustness of the scoring system. After the above steps of parameter adjustment, the accuracy rate for the master text could reach the maximum. However, the statistical variations between the master text and the input sentences might still result in error due to some of the parameters that is very likely to introduce error.

In particular, the parameters for a secondary best high-scored candidate may make some of the constructs of an input sentence to be over emphasized; the error rate may thus be raised. To avoid such conditions, the parameters for the secondary bets candidate will be reduced and the parameters for the one with the highest score will be raised even though the one with the highest score is correctly selected with the current set of parameters. The amount of adjustment will depend on the difference of the scores for the top-1 and the top-2 candidates; the adjustment will stop only when the difference of the scores of the two top candidates reaches an acceptable margin or separation. With such an approach, the effects introduced by the statistical variations between the master text and the input sentences could be reduced; the scoring mechanism thus retain substantial robustness for the various domains of input sentences.

C. Score Function: Method of operation

Figure 6:
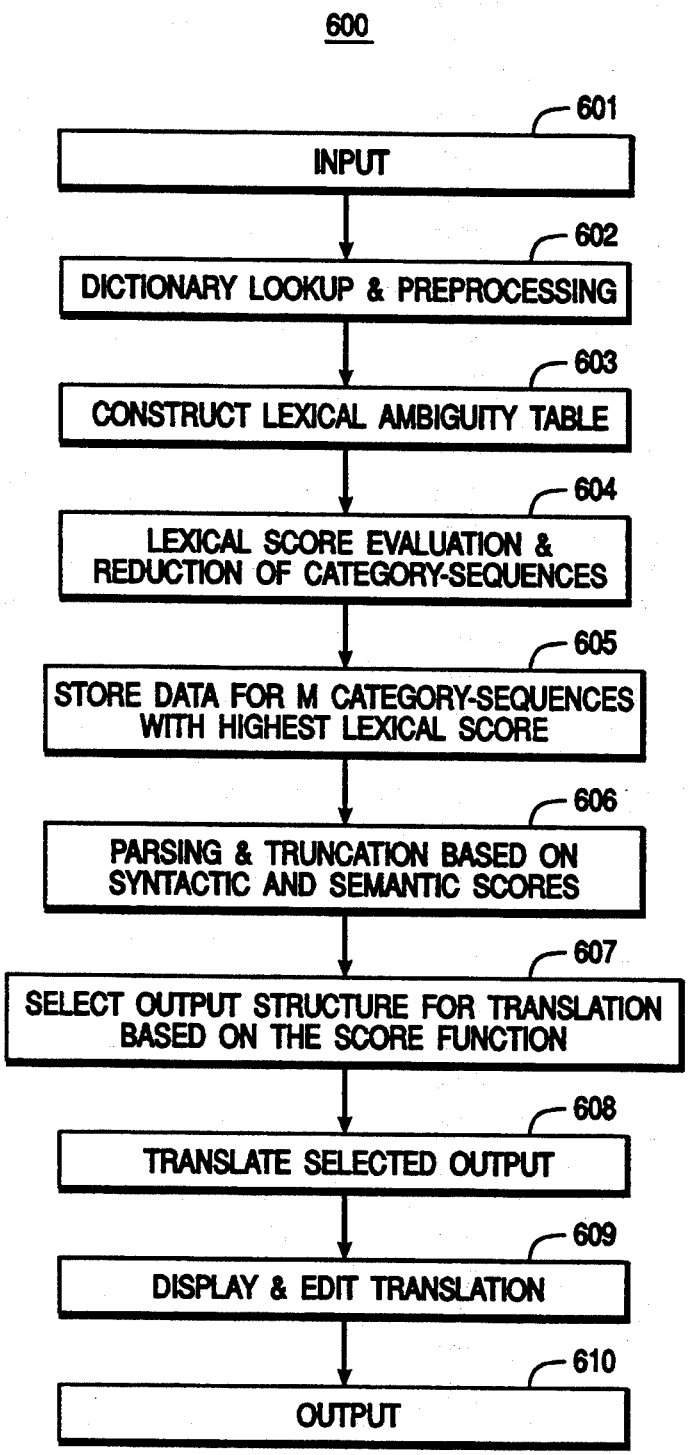
FIG. 6 is a flow chart of the overall operation of the system of the present invention.

Referring now to FIG. 6, the overall operation of a language processing system, such as systems 3, will now be described. In step 601, input or source materials are entered into the system in any convention manner, including keyboard entry, text scanning (optical character recognition), file transfer (e.g., from storage media or communication port), and the like. Those skilled in the art will appreciate other means for inputting source materials into a translation system.

In step 602, the source material undergoes dictionary look up and preprocessing. In the former, lexical information is retrieved from the Lexicon 326. In the latter, stylistic matters (e.g., contractions) are processed. For example, the informal phrase "I'll" is expanded to "I will." Other preprocessing may include the normalization of grammatical constructions which are peculiar to a particular language, such as the correlating conjunction "either ... or" in the English language. Also during preprocessing, equations, graphical information, and special characters (e.g., formatting characters) may be recognized and processed. Thus, preprocessing simplifies subsequent analysis by preparing certain structures in the source material for subsequent translation.

In step 603, a lexical ambiguity table is constructed. In particular, the lexical databases 321, 322 are accessed by the words of a sentence to be translated. Referring now to FIG. 7, the construction of a lexical ambiguity table 700 is illustrated for the sentence "The beautiful rose was a present." As shown, each word of the sentence 701 is analyzed according to its possible part of speech. For example, the words "the" and "a" can only be articles. The word "rose", on the other hand, can be either a noun or a verb. Thus, the table 700 is constructed by indicating the possible parts of speech each word of the sentence may have. In addition to this parts-of-speech assignment, corresponding probabilities for each are obtained from the lexical modules and inserted into the table. From the simple sentence 701 shown in table 700, it can be seen that ambiguity exists with respect to the words "rose" and "present". Particularly, "rose" may represent a noun (flower) or a verb (past tense of "rise"). Similarly, the word "present" may represent a noun, an adjective, or a verb.

Referring now to FIG. 8, the number of possible category sequences for the sentence 701 is determined as follows. The number of possible parts of speech for each word is summed; for example, "rose" has two possible parts of speech while "beautiful" has only one possible part of speech. Next, these sum totals are multiplied together to determine the number of category sequences to be considered. Thus, for the sentence 701, the number of category sequences is: $1 \times 1 \times 2 \times 1 \times 1 \times 3 = 6$. The six possible category sequences 801 are shown in the table 800 of FIG. 8. While there are only six possible category sequences for the short sentence 701, sentences of greater length and/or complexity have substantially greater lexical ambiguity and typically may have one hundred or more possible category sequences to be analyzed.

Referring back to FIG. 6, the category sequences obtained for a given sentence at step 603 are ranked on the basis of the product of weighted lexical category and context probabilities, performed on a word-by-word basis. Next, at step 605, a plurality of category sequences with the highest lexical scores, M are retained. The number M, may be a predetermined number or may be dynamically adjusted such that the correct category sequences may be found within a given set of M category sequences.

Figure 9:
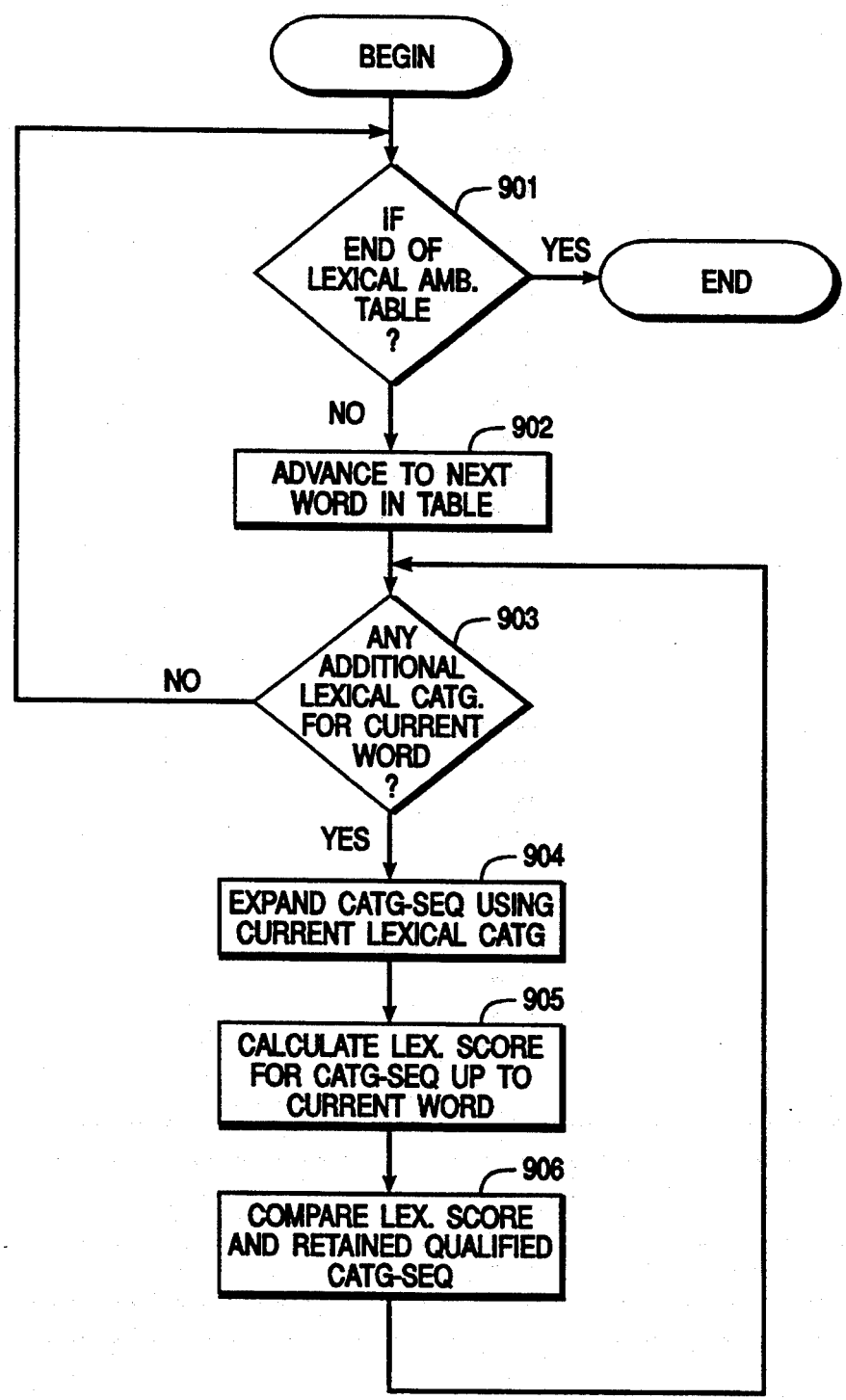
FIG. 9 is a flow chart illustrating the construction of the lexical ambiguity table of FIG. 7, and the evaluation of the lexical score.

Referring to FIG. 9, the process of step 605 is illustrated. In general, every word of a sentence is examined for all lexical categories (by the execution of the loop which comprises steps 903, 904, 905, and 906). In this analysis, the category sequences are qualified on the basis of relative lexical scores at each word index of the sentence. If there are more than M possible category sequences at any word index, the category sequences with higher lexical scores are retained.

The specific steps are as follows. In step 901, the method checks whether it has reached the end of the lexical ambiguity table. If no, then the method proceeds to step 902; otherwise, the method returns. At step 902, the method fetches the next word from the table. At step 903, the method tests whether any additional lexical categories exist for the current word. If yes, then the procedure continues to step 904; otherwise, the method loops back to step 901 for repeating the method. At step 904, the category sequence is expanded using the current lexical category. In step 905, a lexical score is calculated for the category sequence up to the current word. In step 906, the calculated lexical scores are compared and better sequence(s) are retain. After step 906, the method loops back to step 903 to determine if any additional lexical categories for the current word exist.

Referring back to FIG. 6, the method 600 then continues on to step 605 where information defining the category sequences qualified in step 604 are stored. In addition, the lexical scores for each of the category sequences are stored. Based on the stored category sequences (from step 605) and the semantic feature information obtained from the dictionary (from step 602), the method 600 retrieves necessary semantic and syntactic probability information from modules 323 and 324, at step 605. From these, the method performs a depth-first analysis for the candidate category sequences, which may be stored in memory 202 of FIG. 2).

Next, at step 606, the method performs sequential scored-truncation parsing. Particularly, a depth-first analysis traverses a path (guided by the analysis grammar rules) along a single category sequence on a word-by-word basis. However, the analysis continues only as long as an accumulated score (a product of the syntactic and semantic scores) for the analysis structure constructed at each node exceeds the corresponding running thresholds. In a preferred embodiment, the running thresholds employed at step 606 are the "static running thresholds" of module 325. If the accumulated score for a node of an analysis structure is less than the running threshold for that node, the path is truncated. Upon truncation of a path, the method 600 will backtrack to an existing or prior node which may be explored.

In an alternative method of the present invention, parallel scored-truncation parsing is performed. A parallel truncation process or "beam search" expands the parsing state space in a breadth-first direction, thus allowing a number of alternative paths (e.g., N paths) to expand at the end of each step. Since a parallel truncation process explores all possible paths to each node of a sentence being processed, however, sufficient memory space must be available to store temporary structures. In a preferred embodiment, therefore, sequential parsing technique is preferred.

Upon completion of the first acceptable path, the completed analysis structure and path data (including the total accumulated score for the analysis structure) is recorded and forms the "lower bound" for judging subsequent completed paths. In other words, after one complete path has been found, scores of subsequent paths are measured against the running thresholds and against the established lower bound. If the scores of a subsequent path fall below either, the path is truncated and thereby eliminated from further analysis.

The running threshold may be employed for other purposes. If a completed path has a final score that is substantially higher than the accumulated running threshold, the running threshold may be raised to improve the selection process. If, on the other hand, step 606 fails to complete any paths, processing can be restarted using lower running thresholds, or the sentence may be flagged for exceptional handling by the system.

The results for more than one complete path may also be retained during the depth-first traversing to improve the chance of retaining the most preferred analysis structure at the end. The number of complete structures to retain can be predetermined by simulation; alternatively, the number may be varied according to the distribution of the accumulated scores of the complete analysis structure (e.g., only the analysis structure whose score is greater than 80% of the lower bound is retained in the set).

Figure 10A:
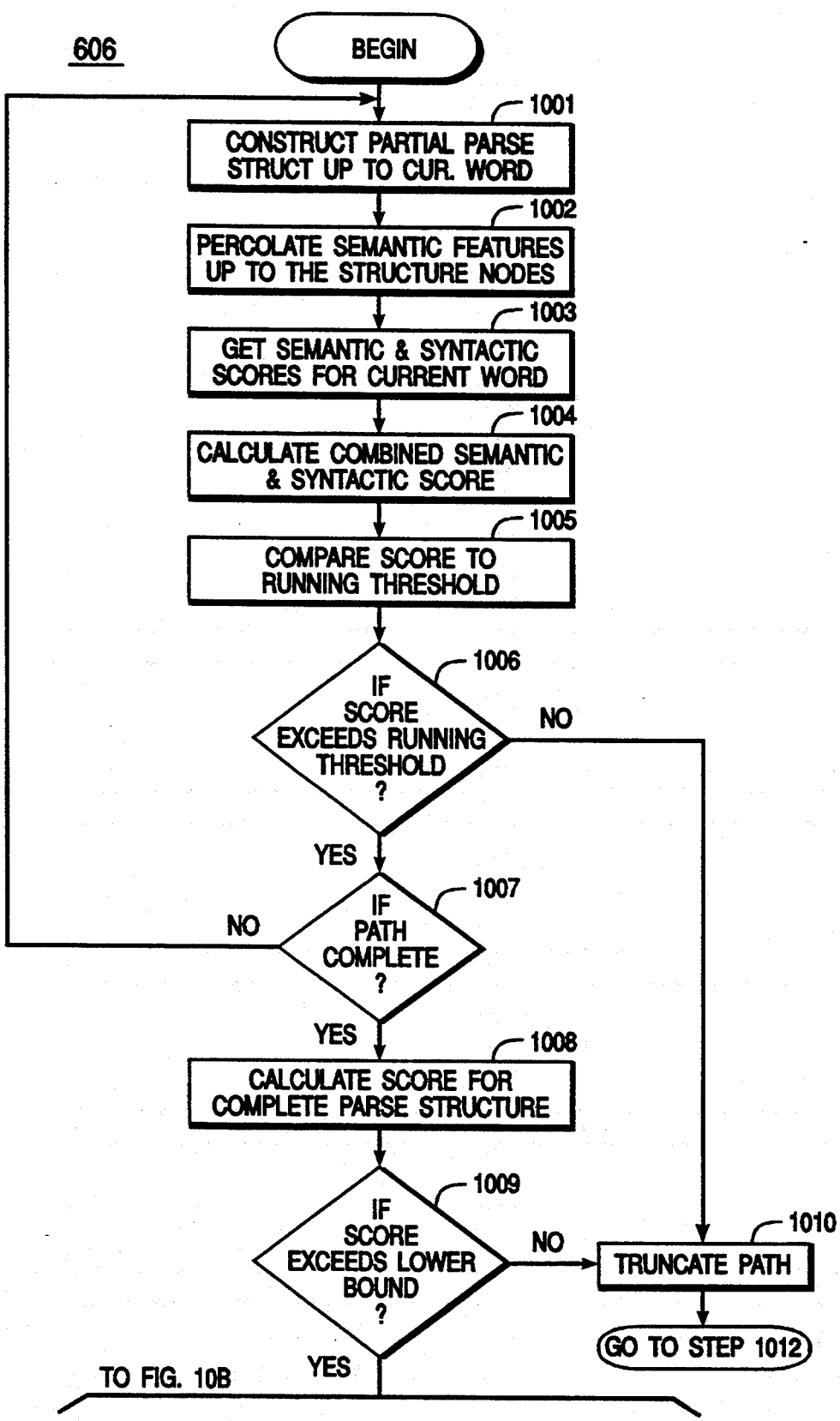
FIGS. 10A-B are a flow chart for the depth-first analysis and truncation of candidate paths which are unlikely to lead to legal syntax structures.
Figure 10B:
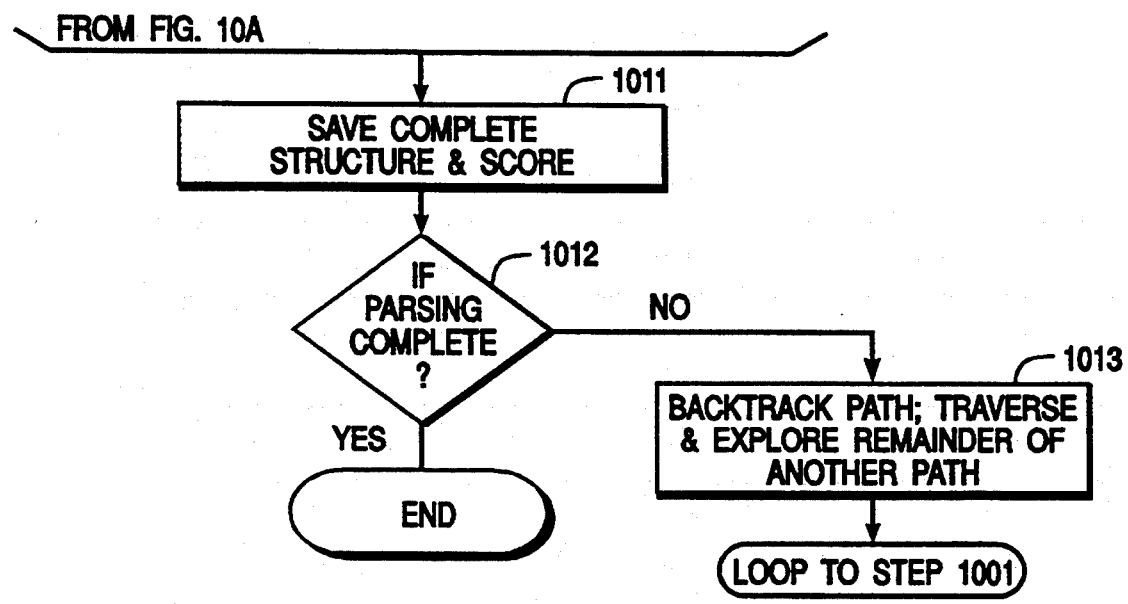

Referring now to FIG. 10, the operation of step 606 is further illustrated. In step 1001 the partial parse structure is constructed up to the current word under examination. In step 1002, the semantic features from the lower level are allowed to percolate upward. In step 1003, the semantic and syntactic scores are retrieved from the knowledge bases 323, 324 by using the current partial structure.

Next, the scores for the current word (node) of a path are retrieved at step 1003. Next, in step 1004 the combined semantic and syntactic scores are calculated, and in step 1005, these scores compared to the running threshold. If, in step 1006, the combined score exceeds the running threshold, then the method proceeds to step 1007. Otherwise (no at 1006), the path is truncated at step 1010 and then continues on to step 1012. At step 1007, the method tests whether the path is complete. If the path is not complete, the method loops back to step 1001; otherwise, the method continues to step 1008 where a score for the complete parse structure is calculated. In step 1009 if the score does not exceed the lower bound, then the path is truncated at step 1010, and the method continues on to step 1012. Otherwise (yes at step 1009), the complete structure and score are saved at step 1011. At step 1012, if the parsing process has not been completed, the method will backtrack previous nodes at step 1013 and then loop back to step 1001 to repeat the process. Otherwise (yes at step 1012), the procedure concludes by returning to the method 600, at step 607.

Referring back to FIG. 6, in step 607, a most preferred structure for translation is selected among the structures stored at step 606 (if more than one path result is retained). Since all structures under consideration contain the same number of nodes, the accumulated scores for completed paths may be compared directly without any normalization. In addition, global heuristic rules may be applied at this step for global disambiguation of the parsed structures before the final output structure is selected.

In step 608, substitution of target language words, phrases, punctuation, and the like, for the elements of the selected paths, are effected on the basis of transfer rules, which rearrange the phrase order and word order of the syntactic structure of sentences in the source language into one appropriate for the target language (including the insertion of additional words which have no counterpart in the source language). These translated outputs may be displayed and edited before output, e.g., by a human reviewer using an interactive user interface, at step 609. Finally, at step 610, the translated output is completed and may be provided in a variety of forms including both electronic and hard copy forms.

Advantages

The score function of the present invention has several advantages over prior art systems. Being statistically based, the score function is more objective than expert systems, which rely upon expert-specified (linguist) certainty factors. Since statistical data are employed, the modules of the present invention are also easier to train and maintain. Furthermore, unlike the inconsistent or uncertain knowledge in a conventional rule-based system, the knowledge embedded in the modules of the present invention retain statistical consistency.

While the invention is described in some detail with specific reference to a preferred embodiment and certain alternatives, there is no intent to limit the invention to that particular embodiment or those specific alternatives. Those skilled in the art will appreciate other alternatives within the scope of the present invention. Therefore, the true scope of the invention is defined not by the foregoing description but by the following claims.

What is claimed is:

1. A language processing system for generating the most likely analysis of the type of an annotated syntax tree of a sentence comprising a word sequence, wherein the word sequence is received from digitally encoded text, and outputting the most likely analysis via computer processing means, wherein said most likely analysis includes the most likely sequence of lexical categories for the words, the most likely syntactic structure of the type of a syntax tree for the sentence, and the most likely semantic attribute for each word, the language processing system comprising:

means for storing dictionary data records containing possible lexical categories and semantic attributes of words in said computer;

means for storing grammar rules, indicative of the parent-children node relationship among grammatical constituents, by computer processing means, and assigning an ordered list of numbers (hereinafter, a permutation vector), for each grammar rule indicative of the semantic precedence of each child node relative to the other nodes;

means for decomposing a syntax tree into a plurality of phrase levels representative of the structure and substructures of said tree, and the context under which a substructure is constructed, by computer processing means;

annotating means for forming an ordered semantic feature vector for each node of a syntax tree representative of the major semantic features of said each node, and the semantic relationship among the features of the words, by transferring the semantic attributes of the words upward to the tree nodes, according to said permutation vectors, by computer processing means;

means for driving data records indicative of the real usage of the words, lexical categories, syntactic structures and semantic feature co-occurrence, in text corpora annotated with lexical categories, syntax trees and semantic attributes, with computer processing means, by using said decomposing means and annotating means;

means for storing statistical data, derived from said annotated text corpora, indicative of the probability of a word among all words having a common lexical category (hereinafter, lexical category probability), the probability of a lexical category being preceded by at least one neighboring lexical category (hereinafter, lexical context probability), the probability of a phrase level being reduced from a neighboring phrase level, or equivalently, the probability of constructing a nonterminal node under a particular contextual environment defined by neighboring terminal or nonterminal nodes (hereinafter, syntactic score probability), and the probability of a node being annotated with a particular ordered semantic feature vector given the syntactic subtree rooted at said node and at least one adjacent node of said node being annotated (hereinafter, semantic score probability);

means for receiving a sentence from computer input devices or storage media;

means, operative on said stored dictionary data, grammar rules and permutation vectors, for determining all possible annotated syntax trees, or equivalently, all possible lexical category sequences for the words, all syntactic structures, of the type of a syntax tree, for said lexical category sequences, and all semantic attribute sequences corresponding to said category sequences, and aid syntactic structures, by computer processing means, for said sentence or word sequence;

means, operative on said stored statistical data by computer processing means, for generating an analysis score, for each possible analysis (or annotated syntax tree), of said sentence or word sequence; and means for determining the most likely sequence of lexical categories for the words;

means for determining the most likely syntactic structure for a sentence;

means for determining the most likely semantic attribute for a plurality of words in the text word; and means for outputting an output annotated syntax tree according to said analysis score thus generated.

2. The system of claim 1, wherein said generating means includes generating an analysis score defined on a lexical score of the determined lexical category sequence, a syntactic score of the determined syntactic structure, a semantic score of the determined semantic attribute sequence, for each possible combination of the lexical category sequence, syntactic structure and semantic attribute sequence based on the optimization of the joint likelihood of the combination for said word sequence.

3. The system of claim 1 further comprising:
means for analyzing said sentence into at least one high score output analysis by retaining, at each word position, a prescribed number of partial analyses of highest scores if the generated analysis score for a partial analysis defined on the word sequence up to a word position is above a preselected level.

4. The system of claim 1, wherein the means for generating an analysis score for each analysis includes:
means for generating a lexical score based on a score of at least one word within a sentence having a particular lexical category sequence.

5. The system of claim 4, wherein the lexical score generating means includes:
means for deriving the score of at least one word within a sentence having a particular lexical category sequence by accessing stored lexical category probabilities and lexical context probabilities according to said at least one word and said particular lexical category sequence and deriving said score from a weighted sum of nonlinearly transformed lexical category probabilities and lexical context probabilities.

6. The system of claim 1, wherein the means for generating an analysis score for each analysis includes:
means for generating a syntactic score based on a score of at least one word within a sentence having a particular syntactic analysis.

7. The system of claim 6, wherein the syntactic analysis is represented as a syntax tree decomposable into a plurality of phrase levels, and wherein the syntactic score is generated from a probability of reducing a phrase level into a lower level by applying stored syntactic score probabilities for each pair of phrase levels.

8. The system of claim 1, wherein the means for generating an analysis score for each analysis includes;
means for generating a semantic score based on a score of at least one word within a sentence having a particular semantic attribute sequence under a determined syntactic structure, wherein the semantic score is generated by annotating said syntactic structure with the semantic attribute sequence according to stored permutation vectors, decomposing the annotated syntax structure into annotated phrase levels, and applying stored semantic score probabilities for each pair of annotated phrase levels.

9. A system for processing digitally encoded language materials for quickly truncating unlikely analyses and outputting at least one most likely analysis, of the type of an annotated syntax tree, by computer processing means comprising:

mean for storing dictionary data records;

means for storing grammar rules;

means for assigning a permutation vector for each grammar rule indicative of the semantic precedence of the children nodes;

means for storing a threshold for each word position indicative of an allowed lower bound of analysis score defined on the word sequence up to said word position;

means for decomposing a tree into a plurality of phrase levels by computer processing means;

annotating means for forming an ordered semantic feature vector for each node of a syntax tree and hence annotating a syntax tree into an annotated syntax tree and a phrase level into an annotated phrase level, according to said permutation vectors, by computer processing means;

means for deriving data records indicative of the real usage of the words, lexical categories, syntactic structures and semantic feature co-occurrence in text corpora, with computer processing means, by using said decomposing means and annotating means; and means for storing statistical data, derived from text corpora, of the type of lexical category probabilities, lexical context probabilities, syntactic score probabilities, and semantic score probabilities;

input means for entering the language materials from computer input devices or storage media, including speech recognition means, said language materials including a plurality of words arranged into sentences;

means for constructing a set of semantically annotated syntac structures for each of the sentences, by computer processing means, according to the dictionary records, stored grammar rules, and stored permutation vectors for the grammar rules;

score determination means for applying stored statistical data, word-by-word at each word position, to define an analysis score, and the corresponding lexical, syntactic and semantic scores, for each annotated syntax tree or partially constructed annotated syntax tree defined on the word sequence up to each word position, means for interrupting the constructing means, in the computer processing stage when an annotated syntax structure being constructed is of low analysis score in comparison with said threshold for the current word position or the lowest analysis score of previously analyzed complete analyses; and means for restarting the constructing means to construct another annotated syntax structure; and means, operably coupled to the constructing means, for selecting from the set a best annotated syntax structure as output for a sentence.

10. The system of claim 9, wherein the constructing means and score determination means includes:

means for determining a lexical category for each word in the sentence and means for determining a lexical score for said lexical category for each word, the said lexical score being determined from the weighted sums of nonlinearly transformed lexical category probabilities and lexical context probabilities.

11. The system of claim 9, wherein the constructing means and score determination means includes:

means for constructing a syntax structure according to stored grammar rules, and means for determining a syntactic score, said syntactic score being determined according to a score of at least one word within a sentence having a particular syntactic analysis by decomposing said syntax tree into a plurality of phrase levels and applying stored syntactic score probabilities for each pair of phrase levels.

12. The system of claim 9, wherein the constructing means and score determination means includes:

means for constructing an annotated syntax structure according to stored permutation vectors, and means for determining a semantic score, said semantic score being determined according to a score, said semantic score being determined according to a score of at least one word within a sentence having a particular semantic attribute sequence by annotating the syntax tree with the semantic attributes according to stored permutation vectors, decomposing the annotated syntax tree into annotated phrase levels and applying stored semantic score probabilities for each pair of annotated phrase levels.

13. A method for translating digitally encoded language materials of a first language into a second language in text or speech with a computer system having a processor module, a memory module and other storage media, user input devices and output devices, the method comprising the steps of:

(a) deriving from text corpora, a set of lexical category probabilities, a set of lexical context probabilities, a set of syntactic score probabilities, and a set of semantic score probabilities, indicative of the use of words, lexical category sequences, syntactic structures and semantic features, (b) storing into the memory module, by computer processing means, the dictionary data records containing possible lexical categories and semantic attributes of words, grammar rules concerning legal syntactic structures of the language of the input sentences, and a permutation vector for each grammar rule indicative of the semantic precedence of children nodes, and statistical data, of the type of lexical category probabilities, lexical context probabilities, syntactic score probabilities and semantic score probabilities;

(c) inputting a source text from said input devices or storage media, said source text having a plurality of words arranged into sentences;

(d) constructing a possible analysis for each sentence by:

(1) determining one possible lexical category sequence, syntactic structure, of the type of a syntax tree, and semantic attributes of the words for said each sentence by computer processing means, in response to the stored dictionary data, grammar rules, and annotating the syntax tree by transferring the semantic attributes upward to the tree nodes according to stored permutation vectors;

(2) determining an analysis score by applying stored statistical data according to determined lexical category sequence, syntactic structure, semantic attributes of the words and the annotated syntax tree, by computer processing means, for said each sentence; and (3) if the determined analysis score is below a preselected value, repeating step (1) with another different combination of lexical, syntactic and semantic information;

(e) repeating step (d) for each sentence of the source text, to construct a plurality of analyses for each sentence; and (f) outputting at least one analysis of said plurality of analyses thus constructed, (g) selecting from the plurality of analyses a best candidate analysis, (h) translating the source text into a target text based on he best candidate analysis for the source text, (i) optionally supplying the target text to a means for speech synthesis.

14. A robust disambiguation system for selecting a preferred analysis, of the type of an annotated syntax tree, of a word sequence, with discrimination and robustness enhanced statistical data for the system, comprising:

means for storing dictionary data records;

means for storing grammar rules and assigning a permutation vector for each grammar rule indicative of the semantic precedence of children nodes;

means for decomposing a syntax tree into a plurality of phrase levels by computer processing means;

annotating means for forming an ordered semantic feature vector for each node of a syntax tree according to said permutation vectors, by computer processing means;

means for deriving data records indicative of the real usage of the words, lexical categories, grammatical syntactic structures and semantic feature co-occurrence, in text corpora, with computer processing means, by using said decomposing means and annotating means;

means for storing statistical data, of the type of lexical category probabilities, lexical context probabilities, syntactic score probabilities, and semantic score probabilities, derived by analyzing a master text using computer processing means, said master text comprising words and annotated lexical categories, syntactic structures of the type of a syntax tree, and semantic attributes;

means for modifying said stored statistical data by enhancing the discrimination power and robustness of the stored statistical data for improving the performance of the system;

means for receiving a word sequence from a digitally encoded input text;

means for deriving a set of candidate analyses of said word sequence, in response to stored dictionary data, grammar rules and permutation vectors, with computer processing means, each said candidate analysis being a possible analysis of lexical category sequence, syntactic structure, and semantic attribute sequence for said word sequence;

means for generating an analysis score, by computer processing means, for each analysis in said set using said statistical data;

means for selecting a preferred analysis from said set of candidate analyses according to the generated analysis score for each candidate analysis in said set by computer processing means; and means for outputting said preferred analysis to make said preferred analysis available for further use in a language processing system.

15. The disambiguation system of claim 14, wherein said analysis deriving means comprises means for deriving the lexical category sequence by:

(a) looking up the dictionary for all possible lexical categories of the words;

(b) constructing a lexical ambiguity table for all possible combinations of the lexical category sequences; and (c) selecting a lexical category sequence and assigning the categories therein to the corresponding words.

16. The disambiguation system of claim 14, wherein said analysis deriving means comprises means for deriving the syntactic category sequence by:

constructing a syntax tree from said word sequence; and decomposing said syntax tree, and hence the syntactic structure, into a plurality of phrase levels.

17. The disambiguation system of claim 14, wherein said analysis deriving means comprises means for deriving the semantic attribute sequence by annotating a syntax tree with semantic features.

18. The disambiguation system of claim 14, wherein said analysis deriving means comprises:

means for decomposing a syntax tree into a plurality of phrase levels;

means for transferring a sequence of semantic features of the words of said word sequence upward to the nodes of said syntax tree; and means for annotating said syntax tree into an annotated syntax tree and said phrase levels into corresponding annotated phrase levels.

19. The disambiguation system of claim 14, further comprising:

means for enhancing the discrimination power of the system by modifying the initial set of stored statistical data (hereinafter, the parameters) based on misjudged instances in analyzing the sentences in the text corpora, by:

(a) using the current set of parameters to select the most likely analysis for sentences in said text corpora;

(b) if the correct analysis is not the selected one, increasing each parameter for generating the scores of the correct analysis by an amount, and reducing the parameters for the selected analysis by said amount, (c) repeating steps (a)-(b) and updating said amount according to a time function of the iteration count, until the accuracy rate for selecting the analyses with the current parameters achieves an expected value.

20. The disambiguation system of claim 14, further comprising:

means for enhancing the robustness of the system by modifying the set of stored statistical data, after it is modified by said discrimination power enhancing means, to enlarge the difference in score between the correct analysis and the competitors, by:

(a) using the current set of parameters to select the most likely analysis for sentences in said text corpora;

(b) if, for a sentence with correctly selected analysis, the difference between the score of the analysis with the highest score and the score of the analysis with the next highest score is less than a preset value, then raising the parameters for the former by an amount and reducing the parameters for the latter by said amount;

(c) repeating steps (a)-(b) until the set of parameters converges to an expected status.

* * * * *

UNITED STATES PATENT AND TRADEMARK OFFICE
CERTIFICATE OF CORRECTION

PATENT NO. : 5,418,717
DATED : May 23, 1995
INVENTOR(S) : Su et al.

It is certified that error appears in the above-identified patent and that said Letters Patent is hereby corrected as shown below:

Column 6,
Line 17, "Suet al.," should be -- Su *et al.*, --.

Column 9,
Line 14, "$(Pw_i \mid c_i)$" should be -- $P(w_i \mid c_i)$ --.

Column 10,
Lines 57 & 58, Equation 1,

"SCORE($Sem_i$, $Syn_j$, $Lex_k$, Words) = $P(Sem_i$, $Syn_j$, $Lex_k$|Words)"

should be divided into two lines as follows:

-- SCORE($Sem_i$, $Syn_j$, $Lex_k$, Words)
= $P(Sem_i$, $Syn_j$, $Lex_k$|Words) --.

Column 11,
Lines 19 & 20, Equation 2,

"SCORE = $P(Sem_i, Syn_j, Lex_k, | w_1...w_n)$
($Sem_i, Syn_j, Lex_k$, Words) = $P(Sem_i | Syn_j, Lex_k, w_1...w_n)$*"

should be corrected as

-- SCORE($Sem_i, Syn_j, Lex_k$, Words)
= $P(Sem_i, Syn_j, Lex_k, | w_1...w_n)$
= $P(Sem_i | Syn_j, Lex_k, w_1...w_n)$* --.

UNITED STATES PATENT AND TRADEMARK OFFICE
CERTIFICATE OF CORRECTION

PATENT NO.    : 5,418,717
DATED         : May 23, 1995
INVENTOR(S)   : Su et al.

It is certified that error appears in the above-identified patent and that said Letters Patent is hereby corrected as shown below:

Column 12,
Lines 6 thru 12, Equation 3, $$\text{"SCORE}_{lex}(\text{Lex}_k) = \prod_{i=1}^{n} P(c_i | c_i^{i-1}, w_1^n)$$
$$\approx \cdots$$
$$\approx \prod_{i=1}^{n} f(P(c_i | c_{i-2}, c_{i-1}), P(w_i | c_i)\text{"}$$

should be $$\text{--SCORE}_{lex}(\text{Lex}_k) = \prod_{i=1}^{n} P(c_i | c_1^{i-1}, w_1^n)$$
$$\approx \prod_{i=1}^{n} P(c_i | c_{i-j}^{i-1}, w_1^n)$$
$$\approx \prod_{i=1}^{n} f\left(P(c_i | c_{i-2}, c_{i-1}), P(w_i | c_i)\right)\text{--}$$

where the subscript of the second "c" in the first line is "1" (one), instead of "i", a second right parenthesis ')' in the third line was omitted.

Lines 42 thru 44, Equation 5, $$\text{"SCORE}_{lex}(\text{Lex}_k) \approx \prod_{i=1}^{n} \left[ P(c_i | c_{i-2}, c_{i-1})^{\alpha_1} \times (pw_i | c_i)^{\alpha_2} \right] \text{"}$$

should be $$\text{--SCORE}_{lex}(\text{Lex}_k) \approx \prod_{i=1}^{n} \left[ P(c_i | c_{i-2}, c_{i-1})^{\alpha_1} \times P(w_i | c_i)^{\alpha_2} \right] \text{--}.$$

Line 49, the symbol " $\zeta$ " should be corrected as -- $\lambda$ --.
Lines 55 thru 57, Equation 5a, $$\text{"} g\left(P(c_i | c_1^{i-1}, w_1^n)\right) \equiv \lambda g$$
$$P|(w_i | c_i)) + (1-\lambda) g\left(P_2(c_i | c_{i-s}^{i-1})\right)\text{"}$$

should be corrected as $$\text{--} g\left(P(c_i | c_1^{i-1}, w_1^n)\right)$$
$$\equiv \lambda g\left(P_1(w_i | c_i)\right) + (1-\lambda) g\left(P_2(c_i | c_{i-s}^{i-1})\right)\text{--}.$$

UNITED STATES PATENT AND TRADEMARK OFFICE
CERTIFICATE OF CORRECTION

PATENT NO. : 5,418,717
DATED : May 23, 1995
INVENTOR(S) : Su et al.

It is certified that error appears in the above-identified patent and that said Letters Patent is hereby corrected as shown below:

Column 13,
Line 15, $$"SCORE_{syn}(Syn_j) = P(Syn_j \mid Lex_k) = P(Syn_j c_1 \cdots c_n)"$$

should be corrected as $$--SCORE_{syn}(Syn_j) \approx P(Syn_j \mid Lex_k) = P(Syn_j \mid c_1 \cdots c_n)--.$$

Column 14,
Line 40, replace "Eq. 9" with -- Eq. 8 --.
Line 66, "Semi" should be corrected as -- $Sem_i$ --, where "i" is a subscript.

Column 16,
Line 7, replace "through" with -- though --.
Lines 42-43, "the highest score (yet not the correct one) are reduced by the same".
The resultant text (lines 42-44) should read -- the one with the highest score (yet not the correct one) are reduced by the same amount. With this --.

Column 17,
Line 8, replace "bets" with -- best --.

Column 24,
Lines 14-16, delete first occurrence of text "said semantic score being determined according to a score". Resultant text should read -- means for determining a semantic score, said semantic score being determine ac --.

Column 26,
Line 14, replace "syntactic category sequence" with -- syntactic structure --.

Signed and Sealed this

Twenty-sixth Day of August, 2003

JAMES E. ROGAN
*Director of the United States Patent and Trademark Office*